United States Patent
Park et al.

(10) Patent No.: US 11,009,634 B2
(45) Date of Patent: May 18, 2021

(54) STRUCTURAL COLOR FILTER AND METHOD OF MANUFACTURING THE STRUCTURAL COLOR FILTER

(71) Applicant: Industry-University Cooperation Foundation Hanyang University, Seoul (KR)

(72) Inventors: Hui Joon Park, Yongin-si (KR); Kyu Tae Lee, Seoul (KR); Ji Yun Jang, Uiwang-si (KR)

(73) Assignee: INDUSTRY-UNIVERSITY COOPERATION FOUNDATION HANYANG UNIVERSITY, Seoul (KR)

(*) Notice: Subject to any disclaimer, the term of this patent is extended or adjusted under 35 U.S.C. 154(b) by 26 days.

(21) Appl. No.: 15/873,426

(22) Filed: Jan. 17, 2018

(65) Prior Publication Data
US 2018/0203170 A1    Jul. 19, 2018

(30) Foreign Application Priority Data

Jan. 18, 2017 (KR) .................. 10-2017-0008528
Jan. 18, 2017 (KR) .................. 10-2017-0008563

(51) Int. Cl.
*G02B 5/22* (2006.01)
*G02B 5/30* (2006.01)
(Continued)

(52) U.S. Cl.
CPC ............ *G02B 5/223* (2013.01); *G02B 1/005* (2013.01); *G02B 5/008* (2013.01); *G02B 5/1809* (2013.01);
(Continued)

(58) Field of Classification Search
CPC ...... G02B 5/008; G02B 5/1809; G02B 5/201; G02B 5/204; G02B 5/26; G02B 5/3058;
(Continued)

(56) References Cited

U.S. PATENT DOCUMENTS 7,989,254 B2 * 8/2011 Yoon ................. G02F 1/133514
                                                            438/70
8,547,504 B2 * 10/2013 Guo .................. G02F 1/133516
                                                            349/96

(Continued)

FOREIGN PATENT DOCUMENTS

JP    2011013330 A    1/2011
JP    2013525863 A    6/2013

OTHER PUBLICATIONS

Lee et al., "Subwavelength nanocavity for flexible structural transmissive color generation with a wide viewing angle," Optica, vol. 3, No. 12, Dec. 2016, p. 1489-1495. (Year: 2016).*

(Continued)

*Primary Examiner* — Nicholas R. Pasko
(74) *Attorney, Agent, or Firm* — Sughrue Mion, PLLC

(57) ABSTRACT

The present disclosure provides a structural color filter comprising: a substrate; a metal layer disposed on the substrate; and semiconductor gratings disposed on the metal layer, wherein each of the semiconductor gratings is elongated in a first direction, wherein the semiconductor gratings are arranged to be spaced apart from each other in a second direction perpendicular to the first direction, wherein the semiconductor gratings have the same thickness, wherein the thickness is smaller than a wavelength of visible-light.

5 Claims, 24 Drawing Sheets

(51) Int. Cl.
   *G02B 5/18*    (2006.01)
   *G02B 5/00*    (2006.01)
   *G02B 1/00*    (2006.01)
   *G02B 27/28*   (2006.01)
   *G02F 1/1335*  (2006.01)
   *C09C 3/08*    (2006.01)
   *C09C 3/06*    (2006.01)

(52) U.S. Cl.
   CPC .............. *G02B 5/30* (2013.01); *G02B 27/288* (2013.01); *G02F 1/133514* (2013.01); *G02F 1/133533* (2013.01); *C09C 3/063* (2013.01); *C09C 3/08* (2013.01); *G02B 5/3058* (2013.01); *G02F 2202/32* (2013.01); *G02F 2203/10* (2013.01)

(58) Field of Classification Search
   CPC . G02B 1/005; G02B 27/288; G02F 1/133514; G02F 1/133533; G02F 2001/133548; G02F 2203/10; G02F 2202/32
   USPC .......................... 359/487.03, 487.05, 491.01
   See application file for complete search history.

(56) References Cited

U.S. PATENT DOCUMENTS

| 8,587,751 | B2* | 11/2013 | Kim ................. G02F 1/133533 349/106 |
| 9,297,939 | B2* | 3/2016 | Palanchoke ............ G02B 5/203 |
| 2006/0147617 | A1* | 7/2006 | Chen ..................... G02B 5/201 427/162 |
| 2008/0316599 | A1* | 12/2008 | Wang ................... G02B 5/3058 359/485.05 |
| 2011/0170042 | A1* | 7/2011 | Cho ................. G02F 1/133514 349/106 |
| 2013/0300986 | A1* | 11/2013 | Kang ................... G02B 5/3058 349/96 |
| 2014/0029104 | A1* | 1/2014 | Guo ....................... G02B 5/008 359/585 |
| 2014/0063467 | A1* | 3/2014 | Takahashi ............ G02B 5/3058 353/20 |
| 2014/0268332 | A1* | 9/2014 | Guo ....................... G02B 5/008 359/487.01 |

OTHER PUBLICATIONS

Lee et al., "Ultrathin metal-semiconductor-metal resonator for angle invariant visible band transmission filters," Appl. Phys. Lett. 104, 231112 (2014); https://doi.org/10.1063/1.4883494 (Year: 2014).*

Kanamori et al., "Fabrication of transmission color filters using silicon subwavelength gratings on quartz substrates," IEEE Photonics technology letters, vol. 18, No. 20, Oct. 15, 2006, 2126-2128. (Year: 2006).*

Yoon, Y-T., et al., "Color filter incorporating a subwavelength patterned grating in poly silicon", Optical Society of America, vol. 16, No. 4, 2008, Optics Express, pp. 2374-2380 (7 pages).

* cited by examiner

[FIG. 1A]
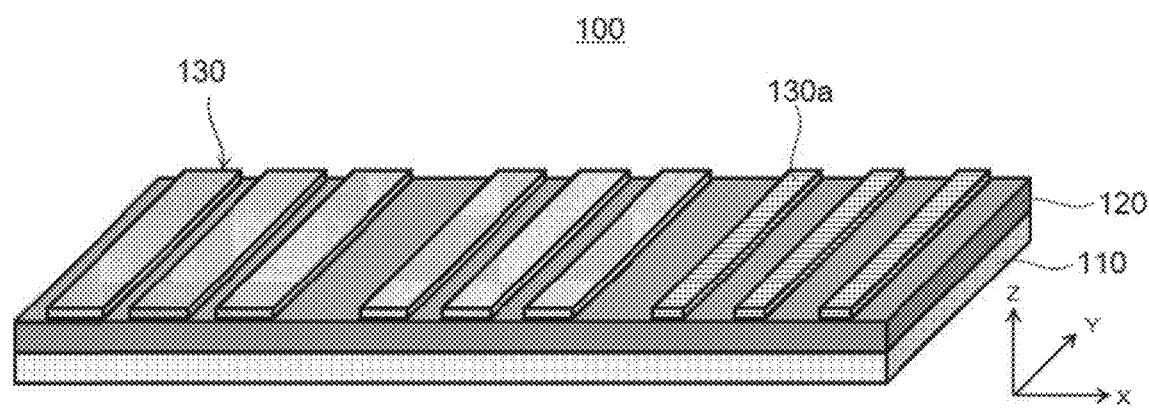
[FIG. 1B]
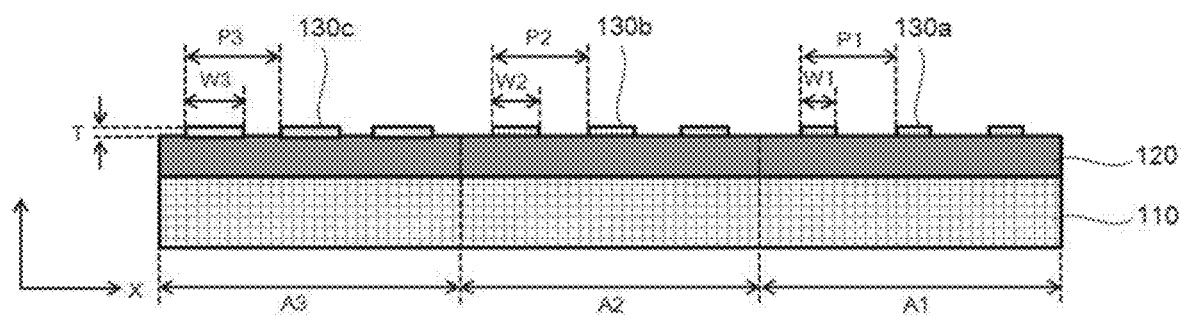

[FIG. 2]
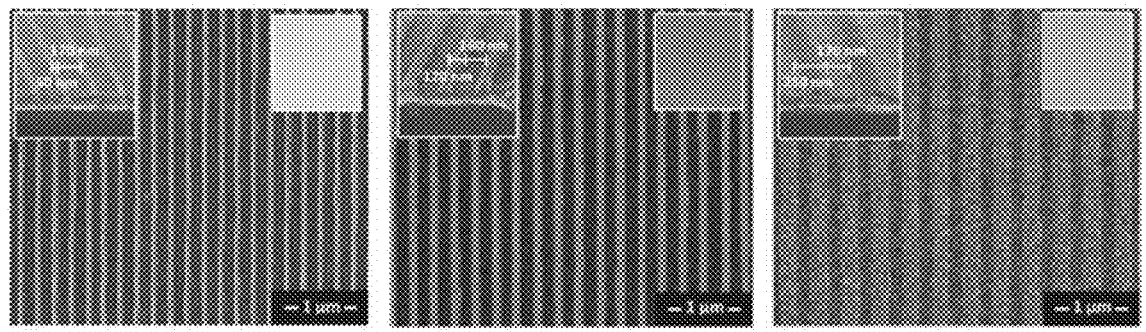
[FIG. 3A]
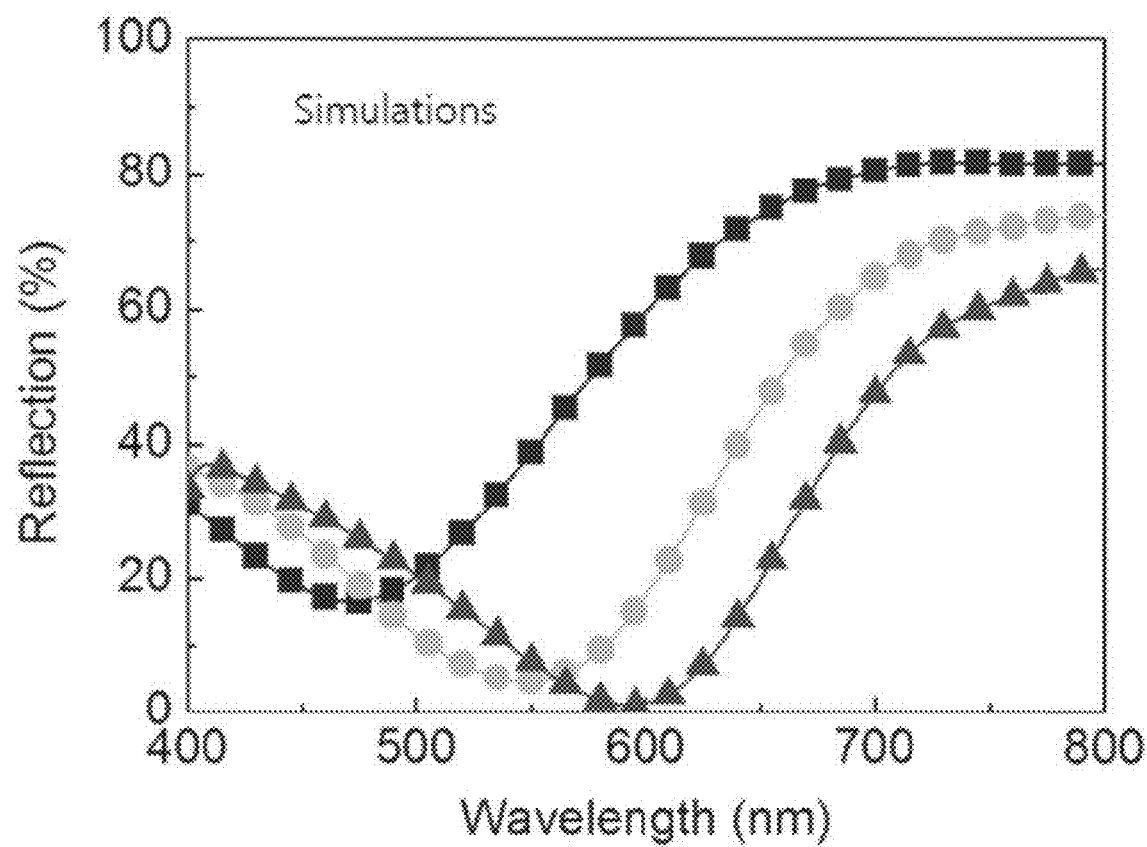

[FIG. 3B]
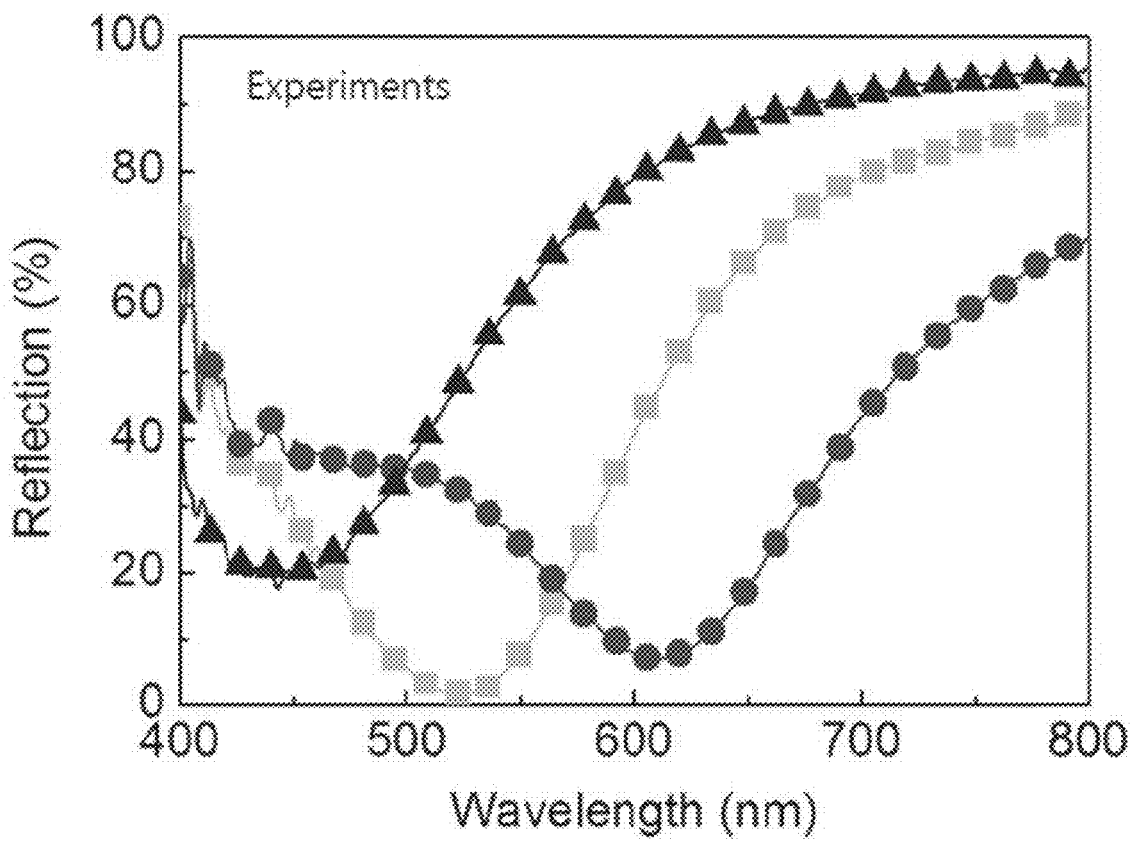

[FIG. 3c]
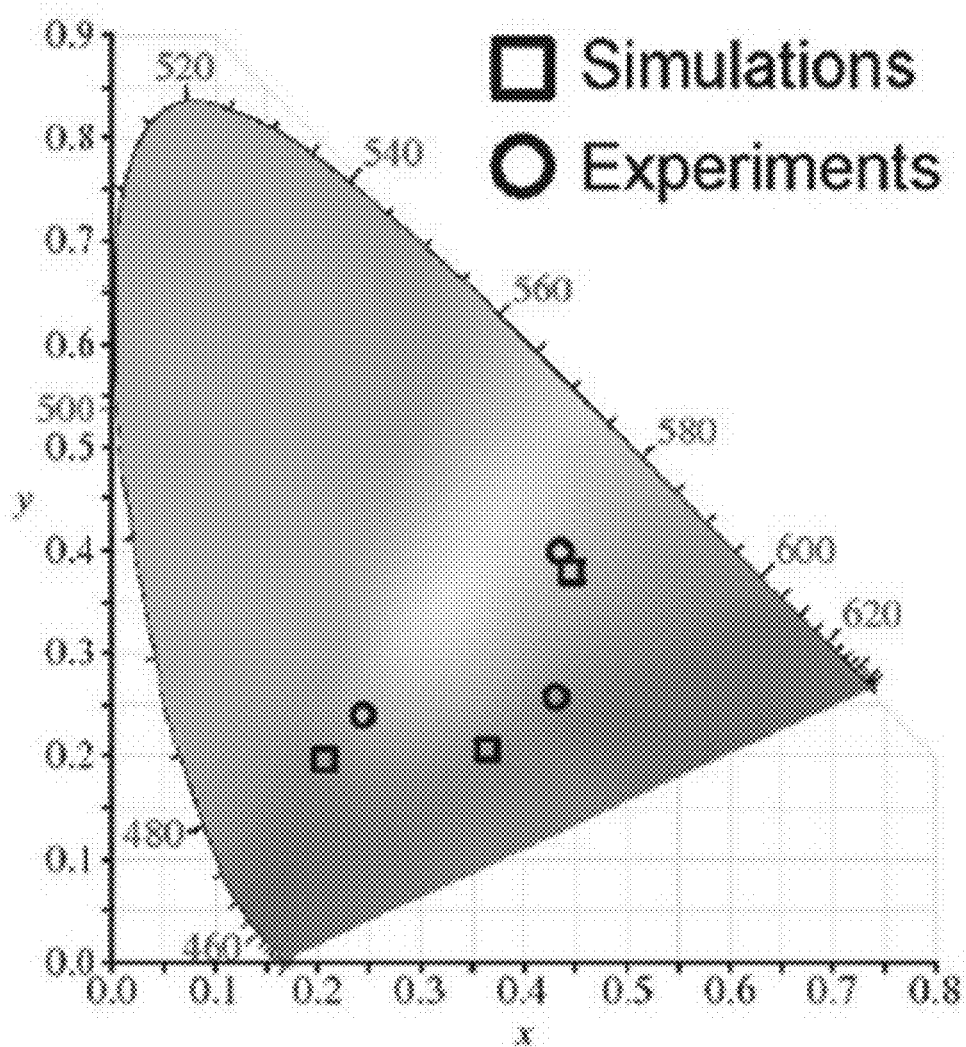

[FIG. 4]
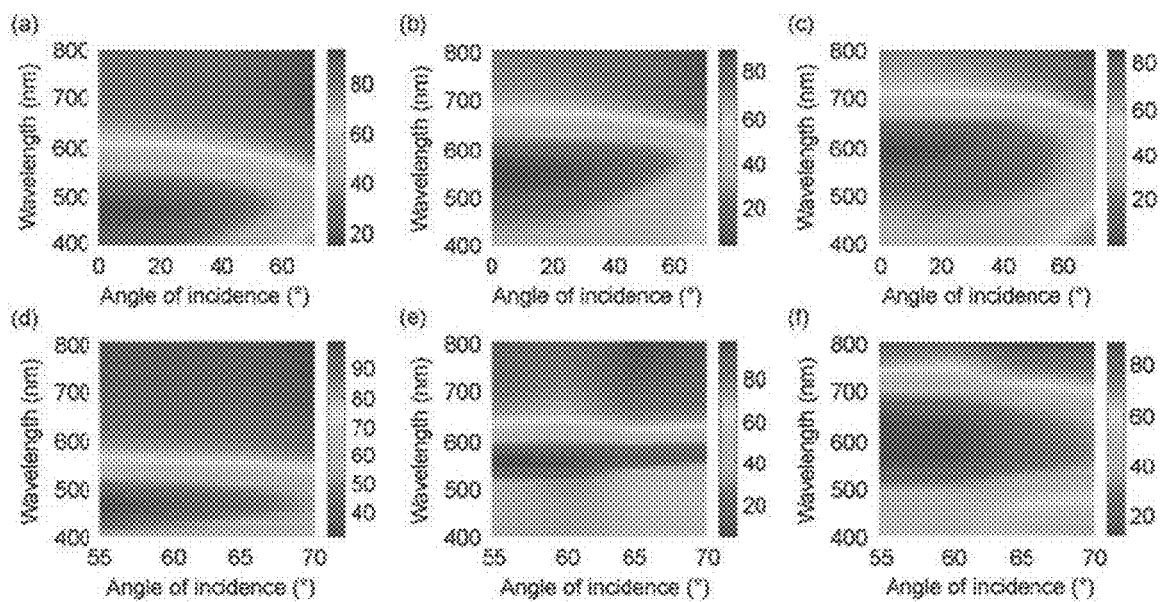
[FIG. 5]
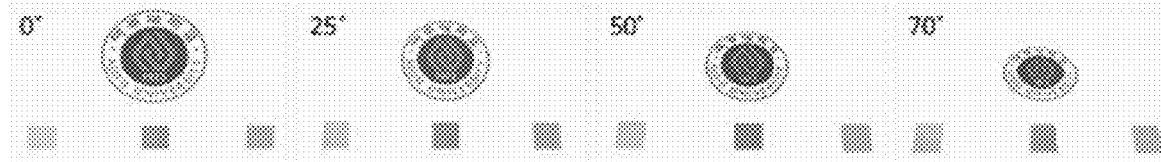

[FIG. 6A]
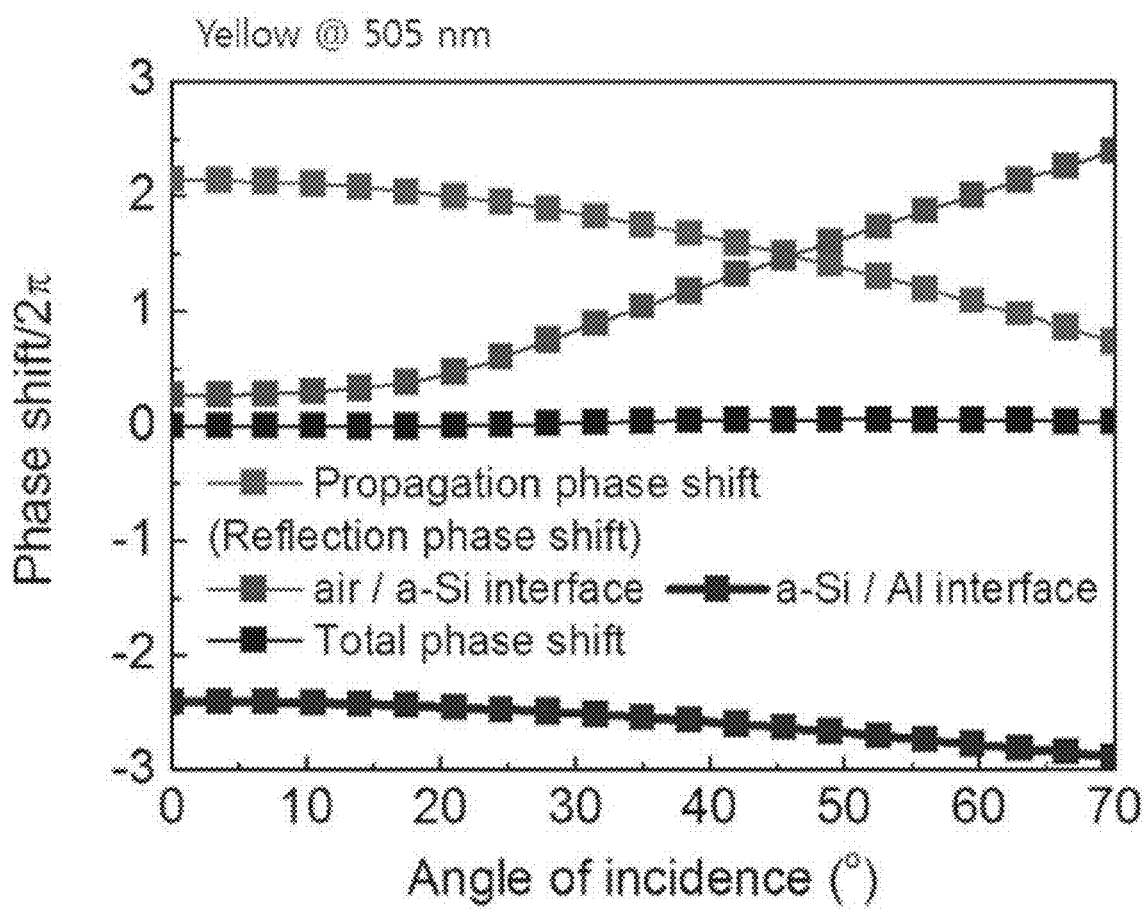

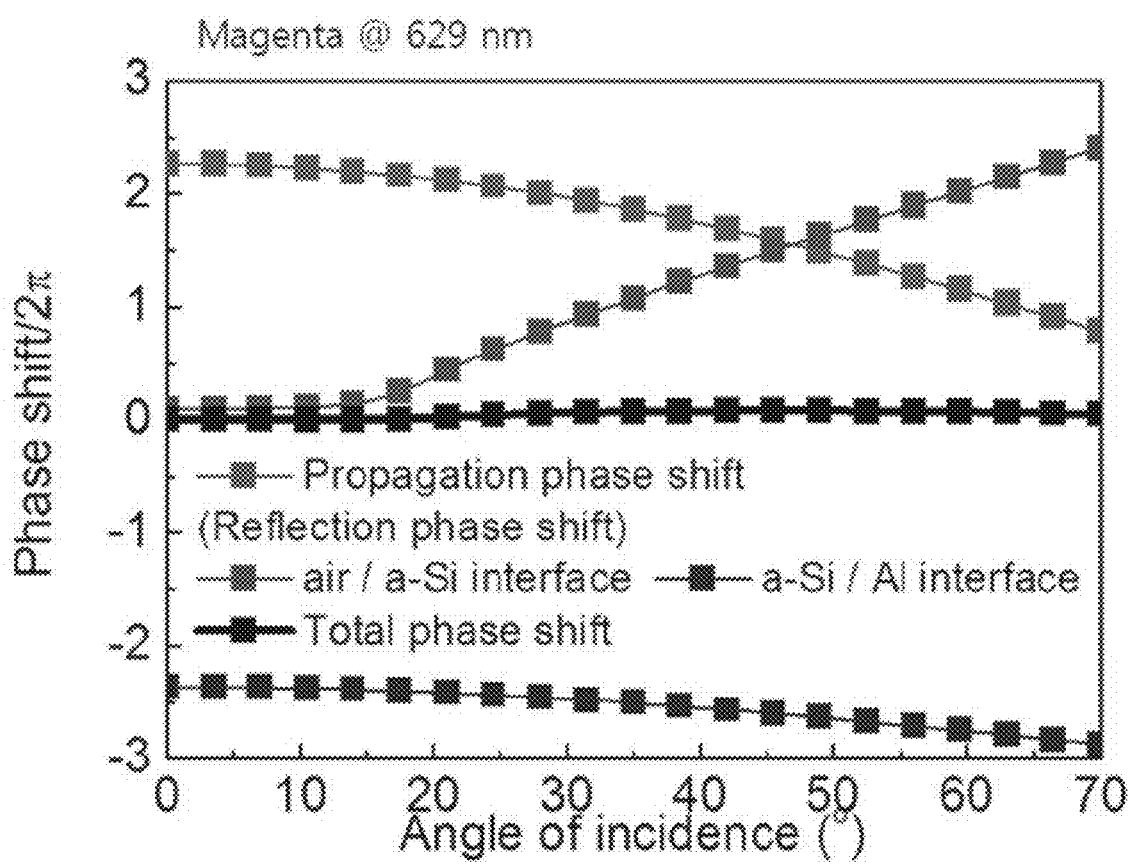
[FIG. 6B]

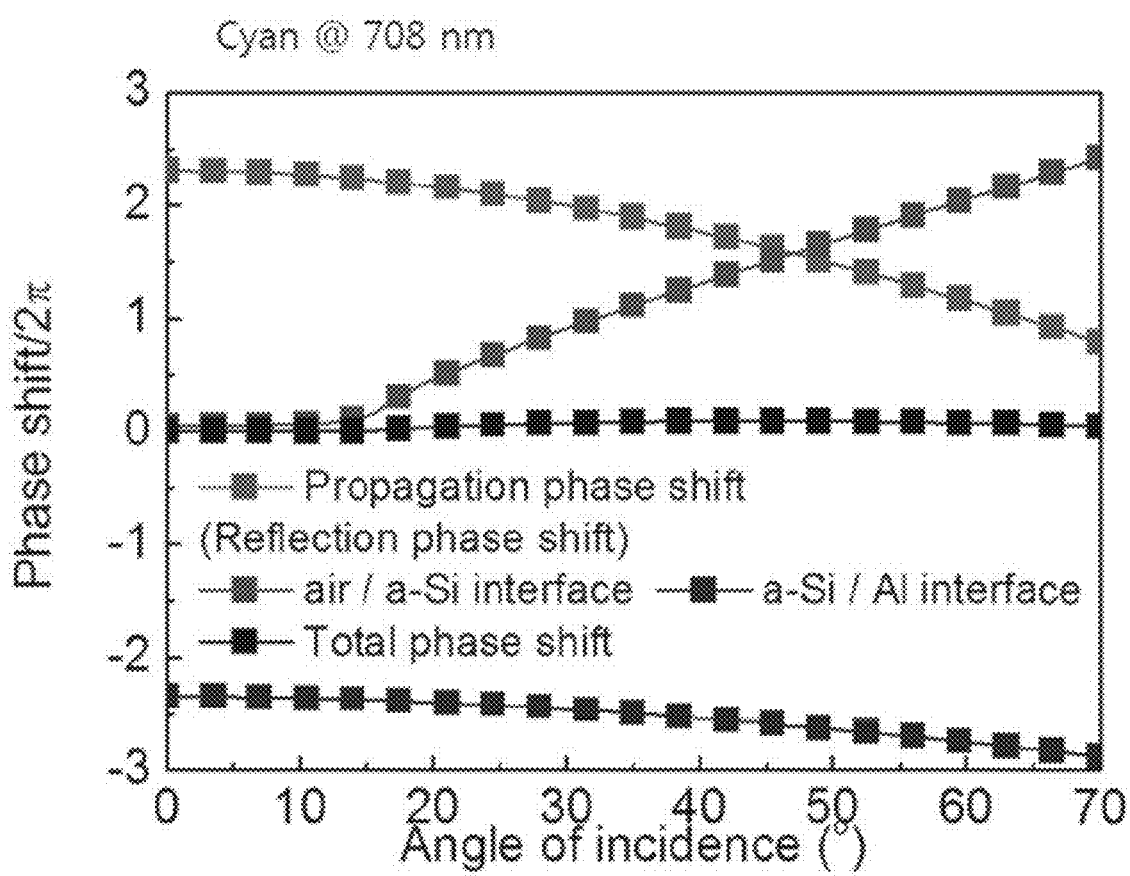
[FIG. 6c]

[FIG. 7]
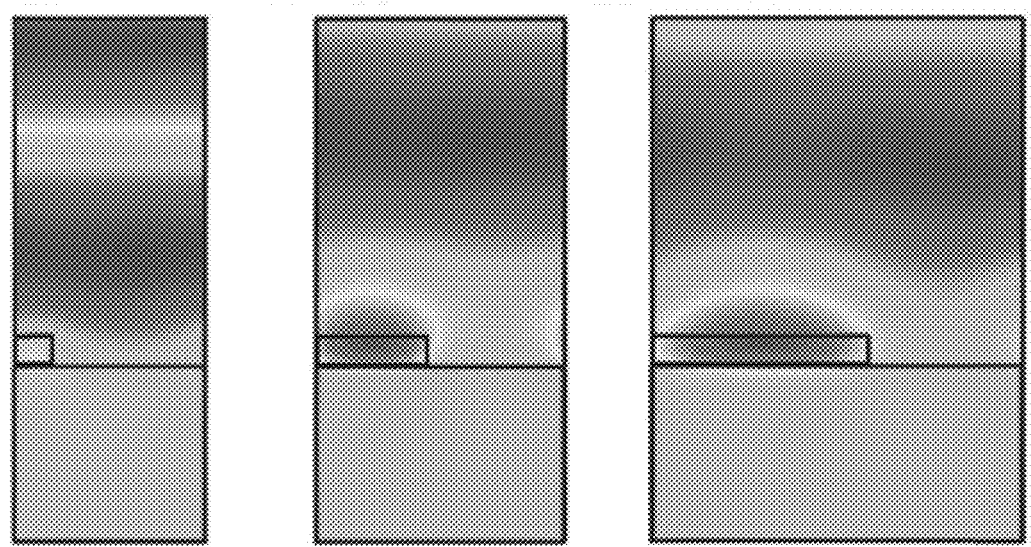
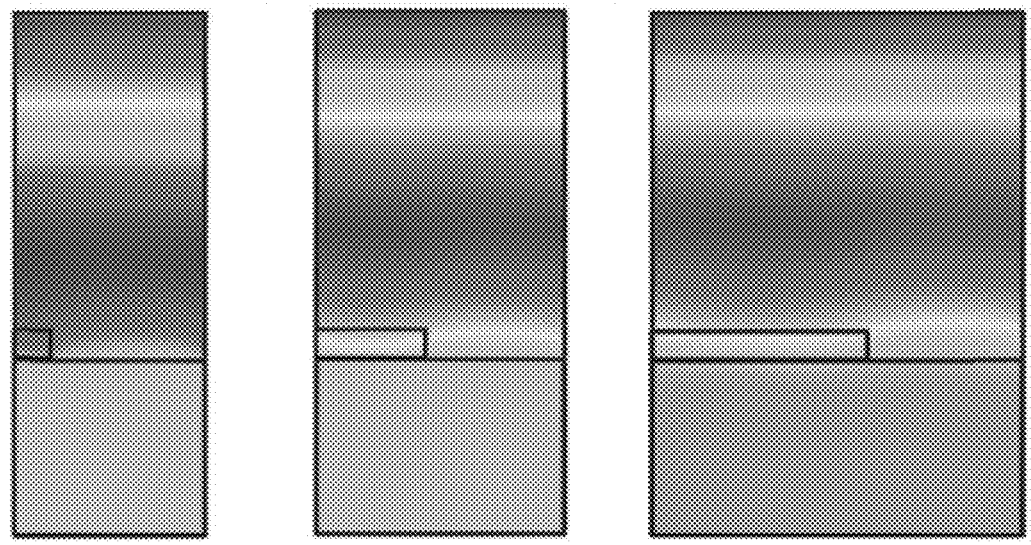

[FIG. 8]
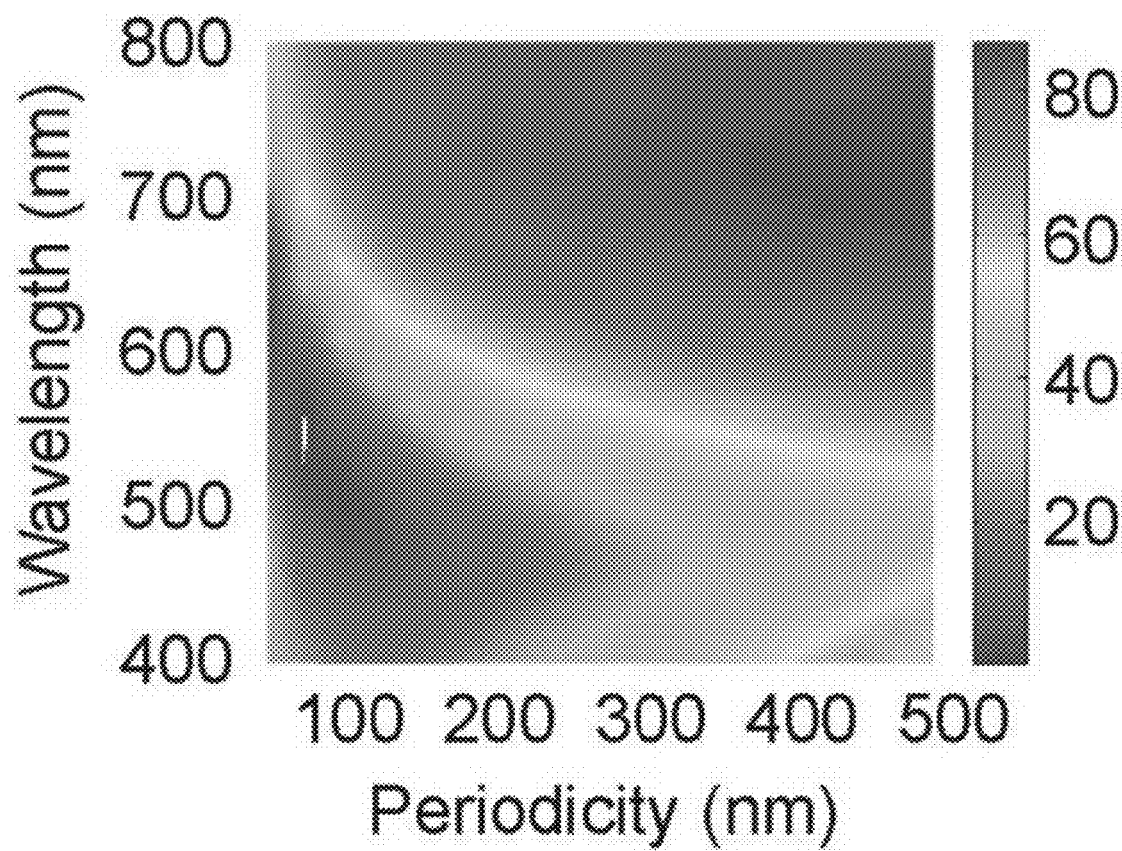

[FIG. 9]
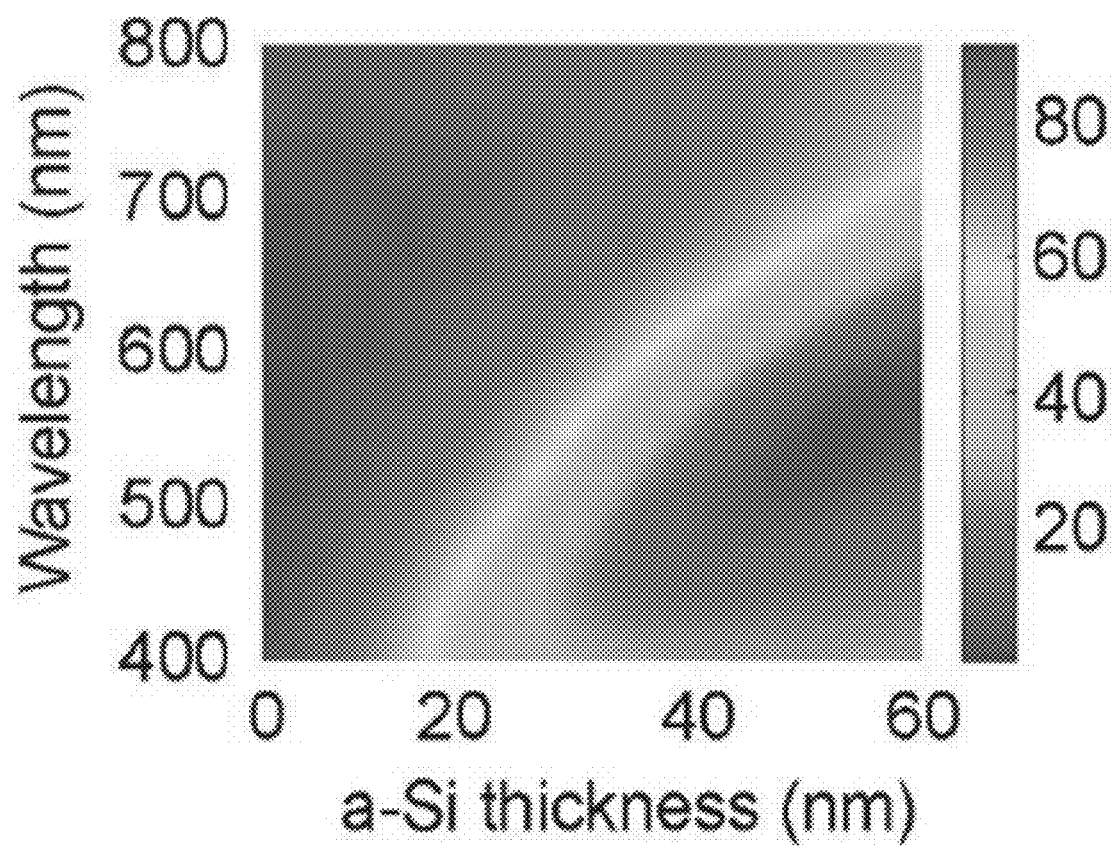

[FIG. 10]
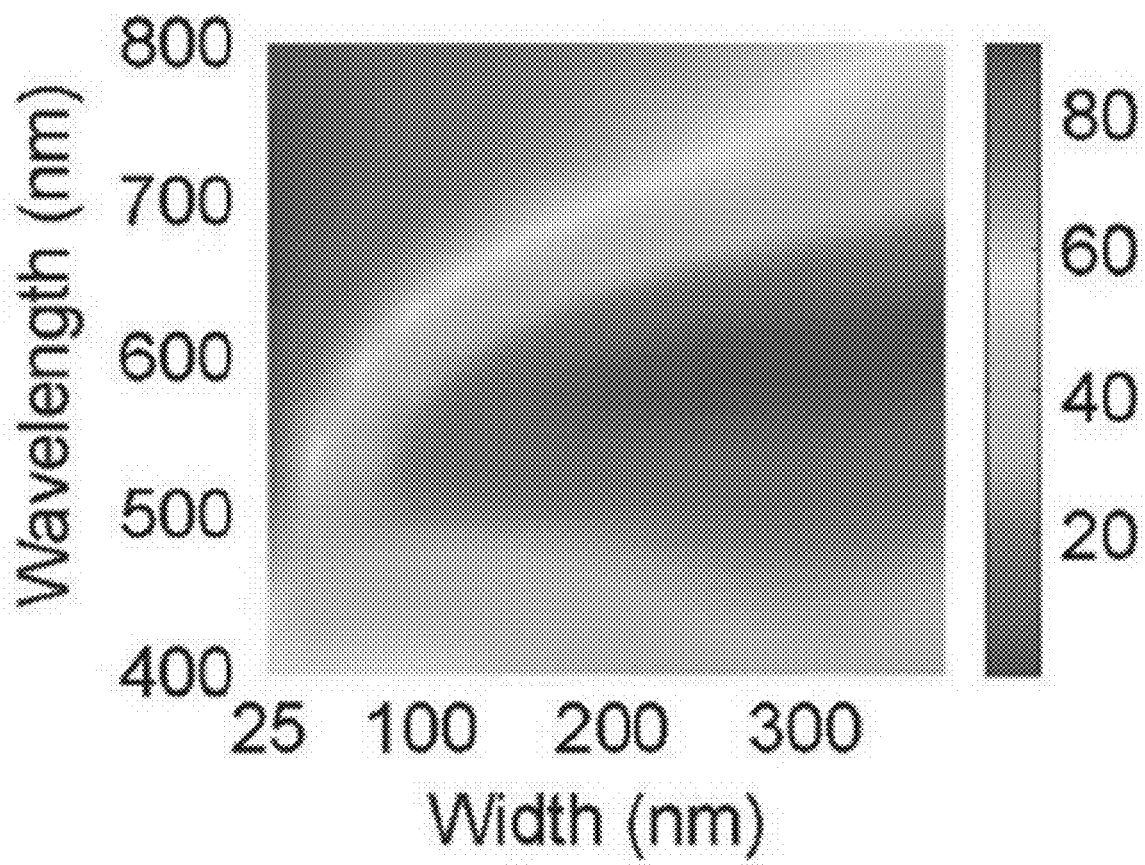

[FIG. 11A]
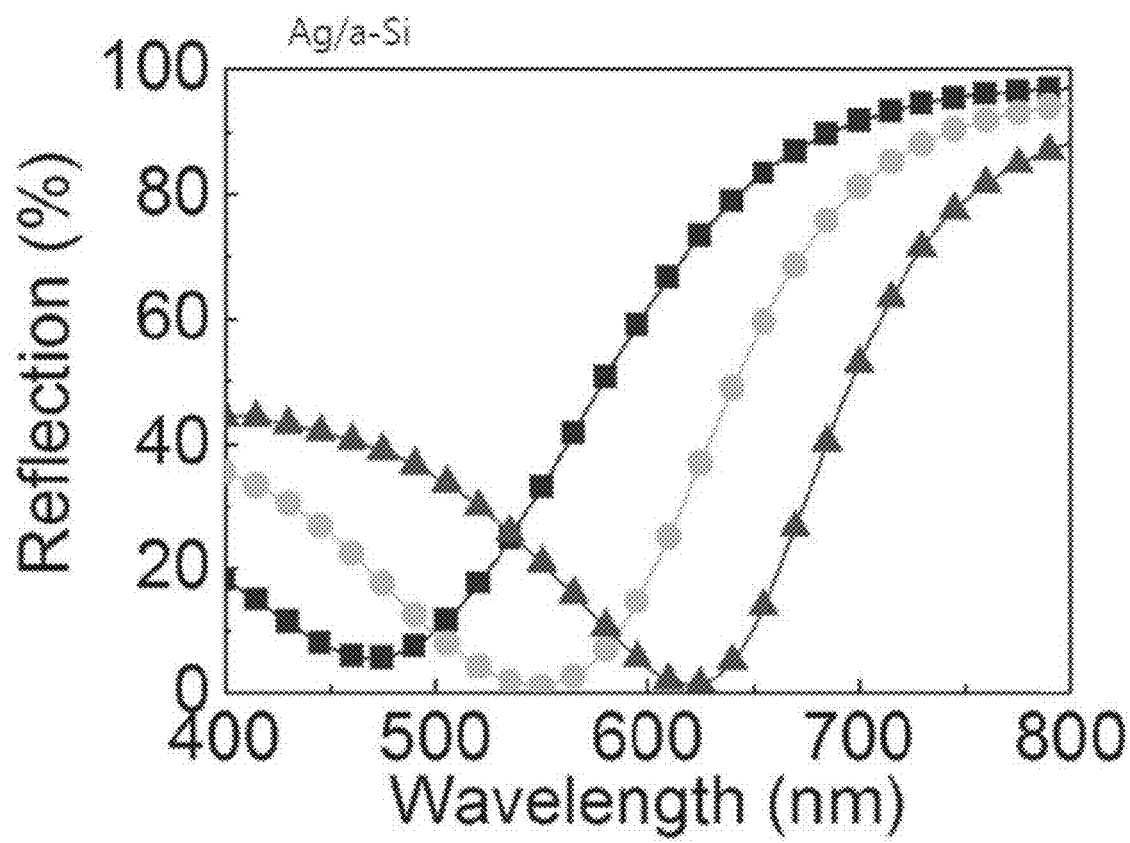

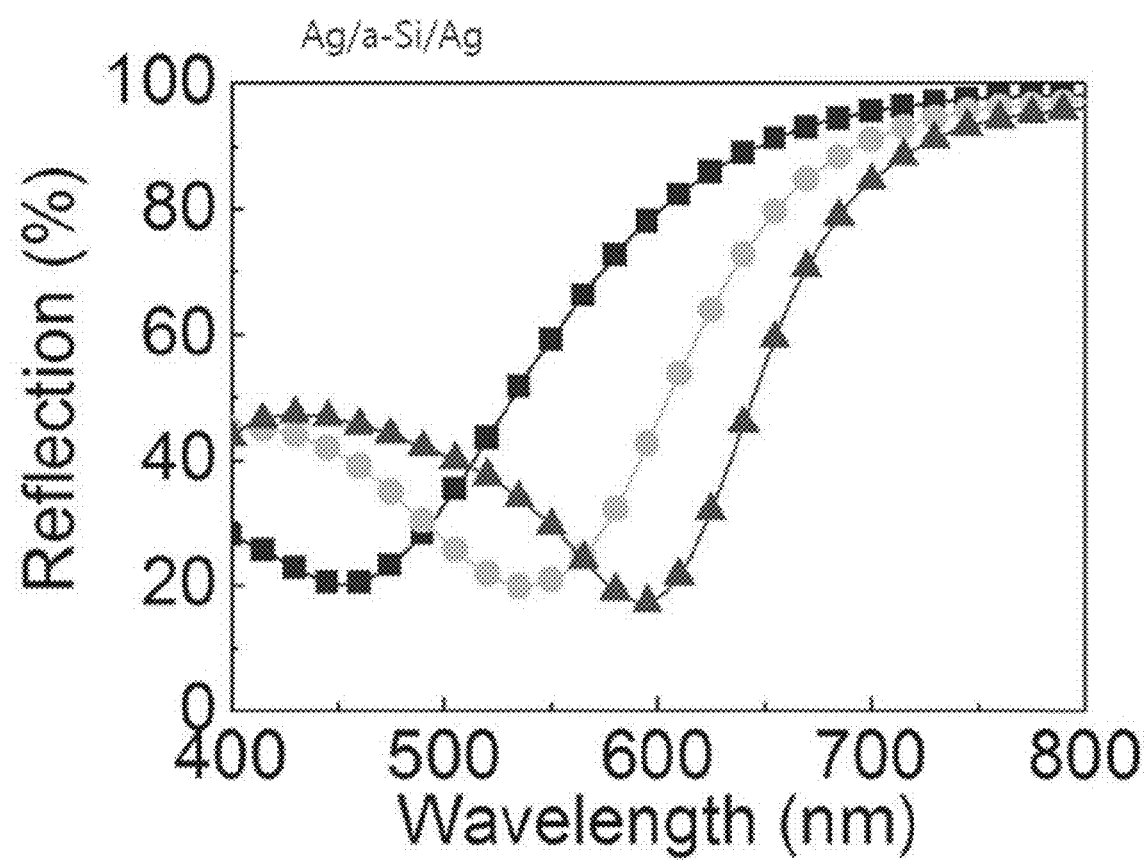
[FIG. 11B]

[FIG. 12A]
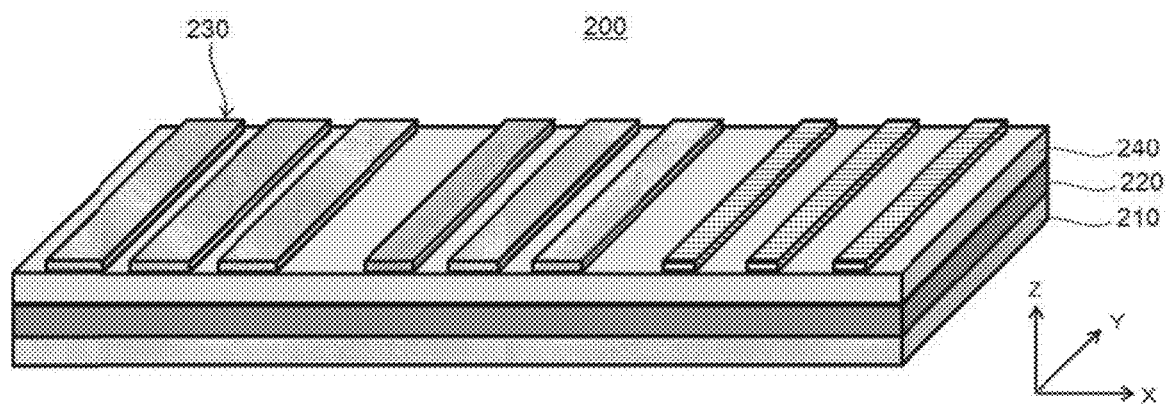
[FIG. 12B]
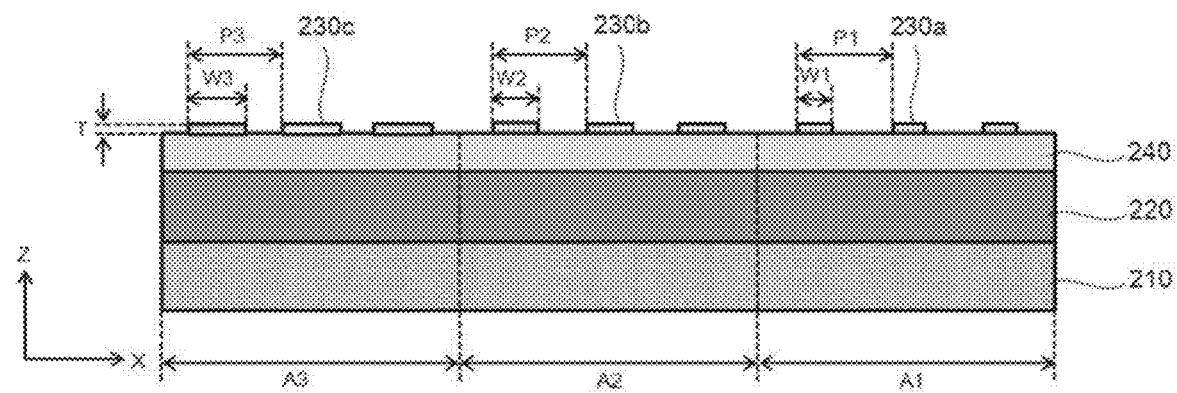

[FIG. 13]
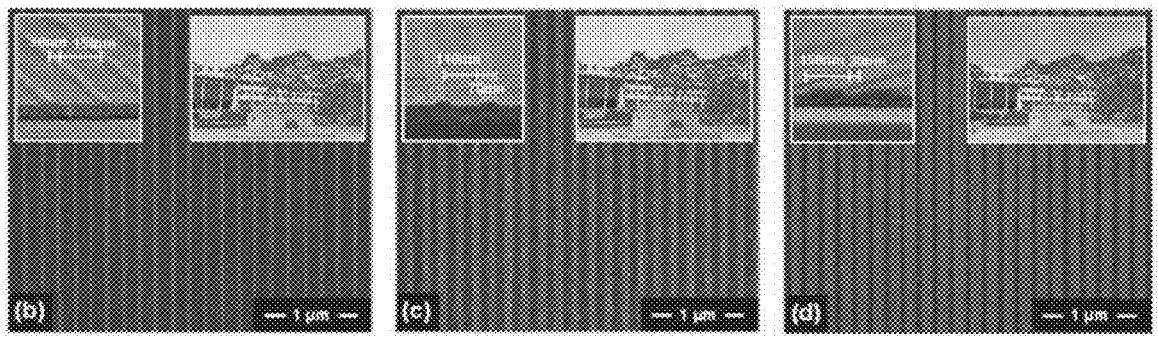
[FIG. 14A]
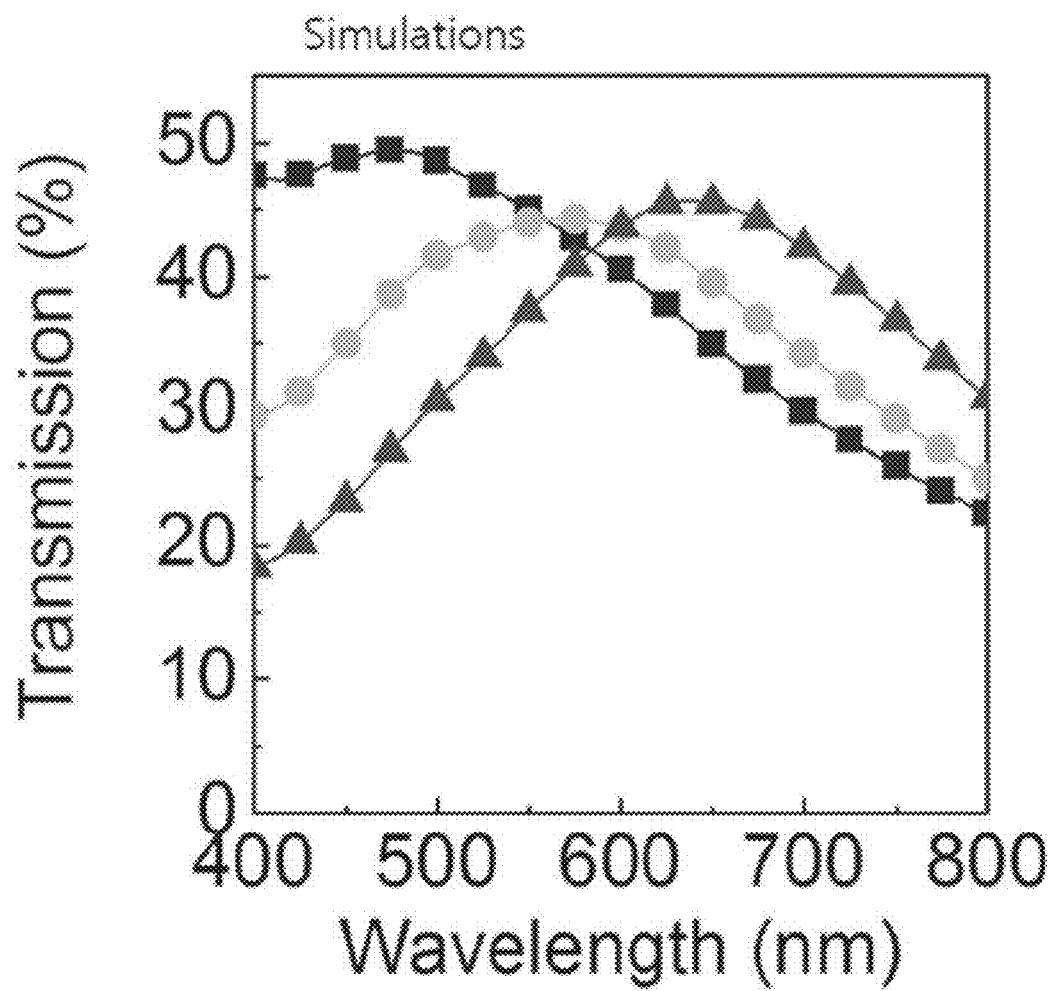

[FIG. 14B]
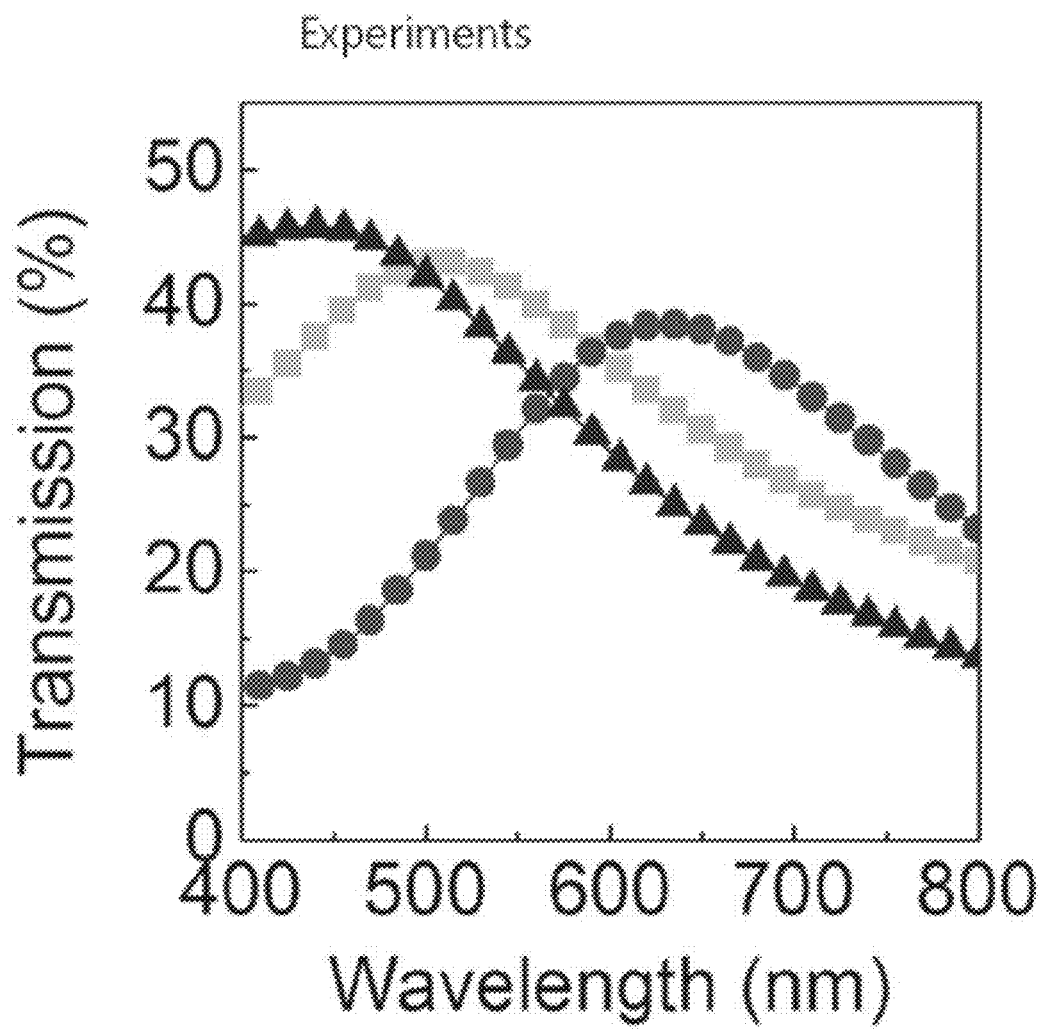

[FIG. 15]
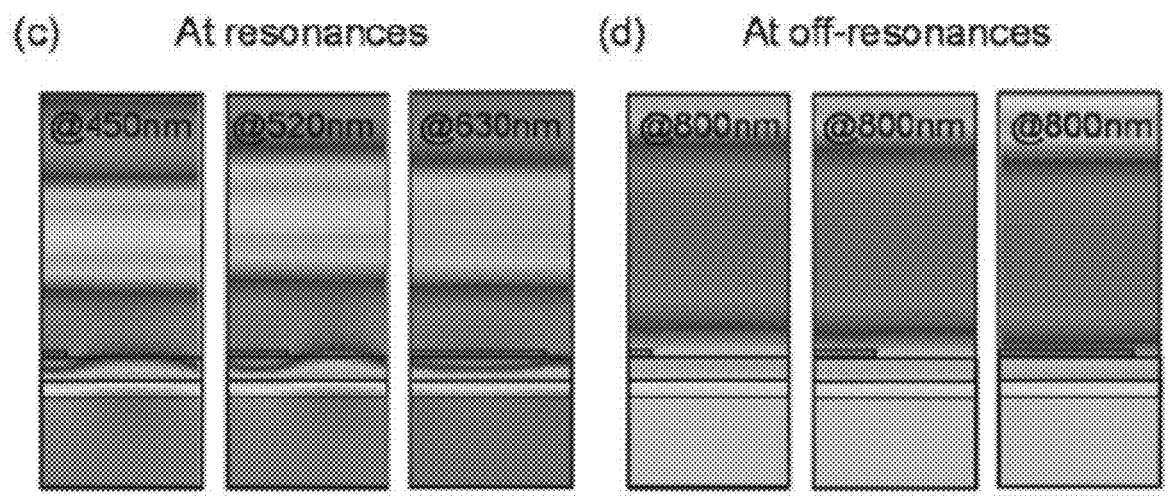
[FIG. 16]
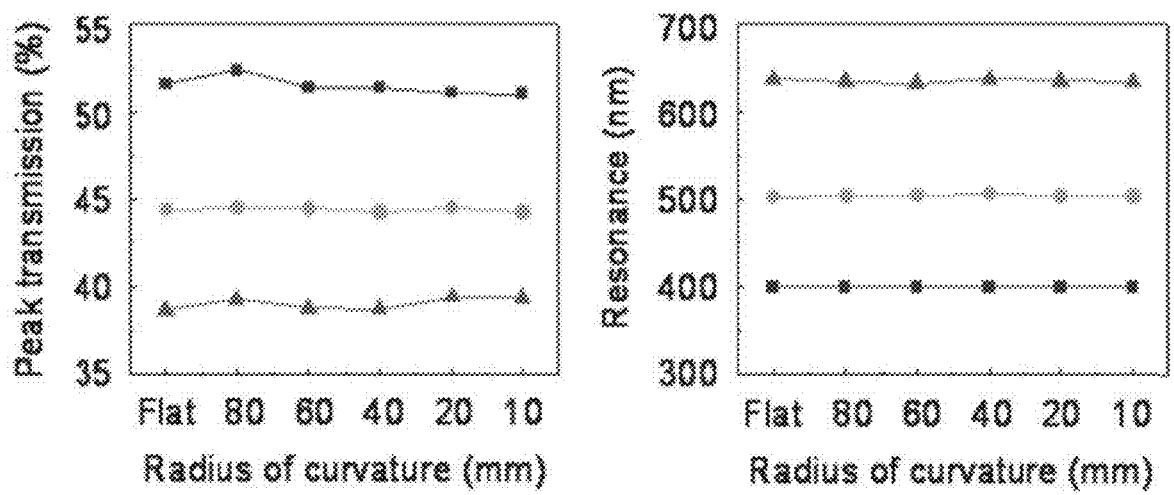

[FIG. 17]
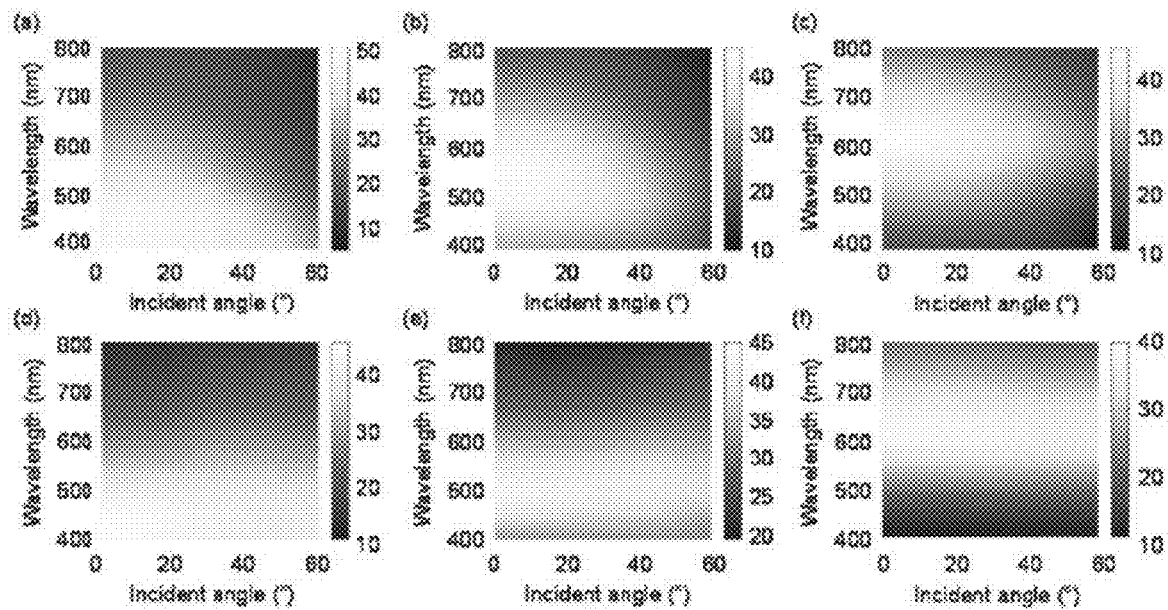
[FIG. 18A]
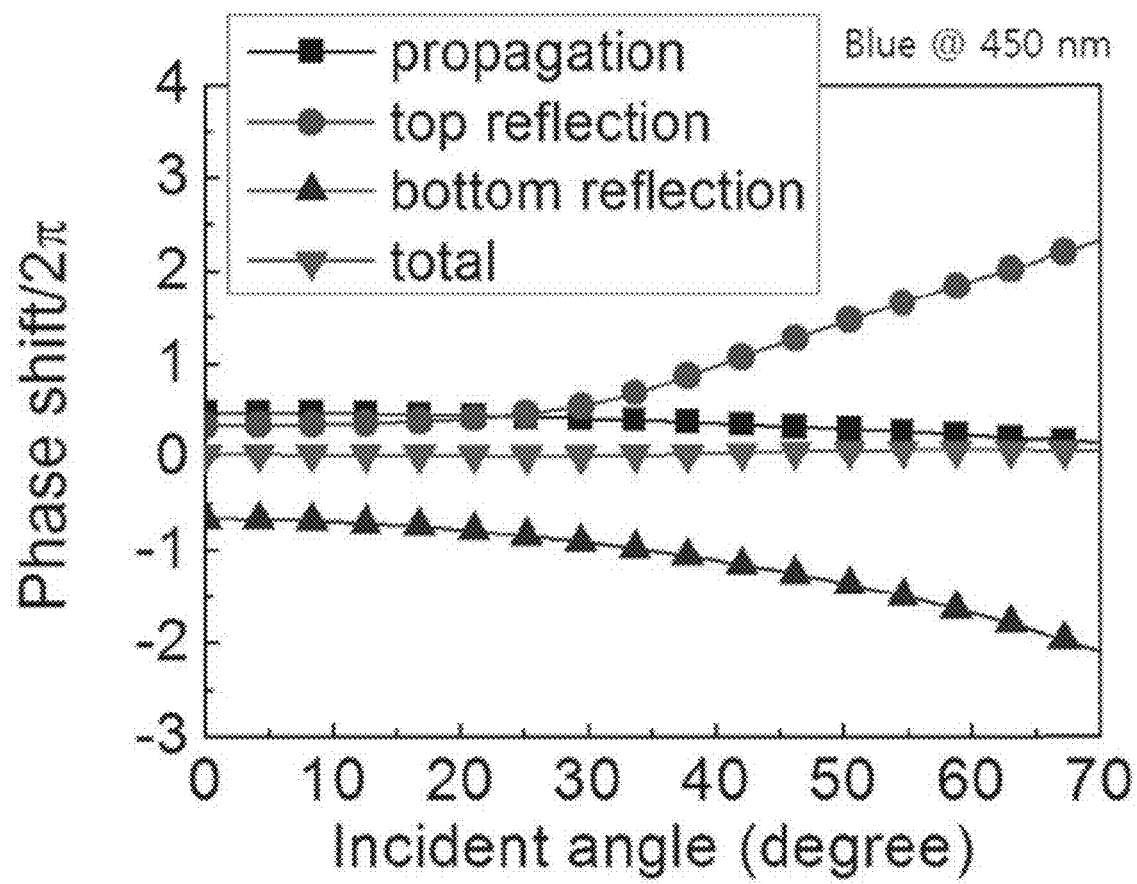

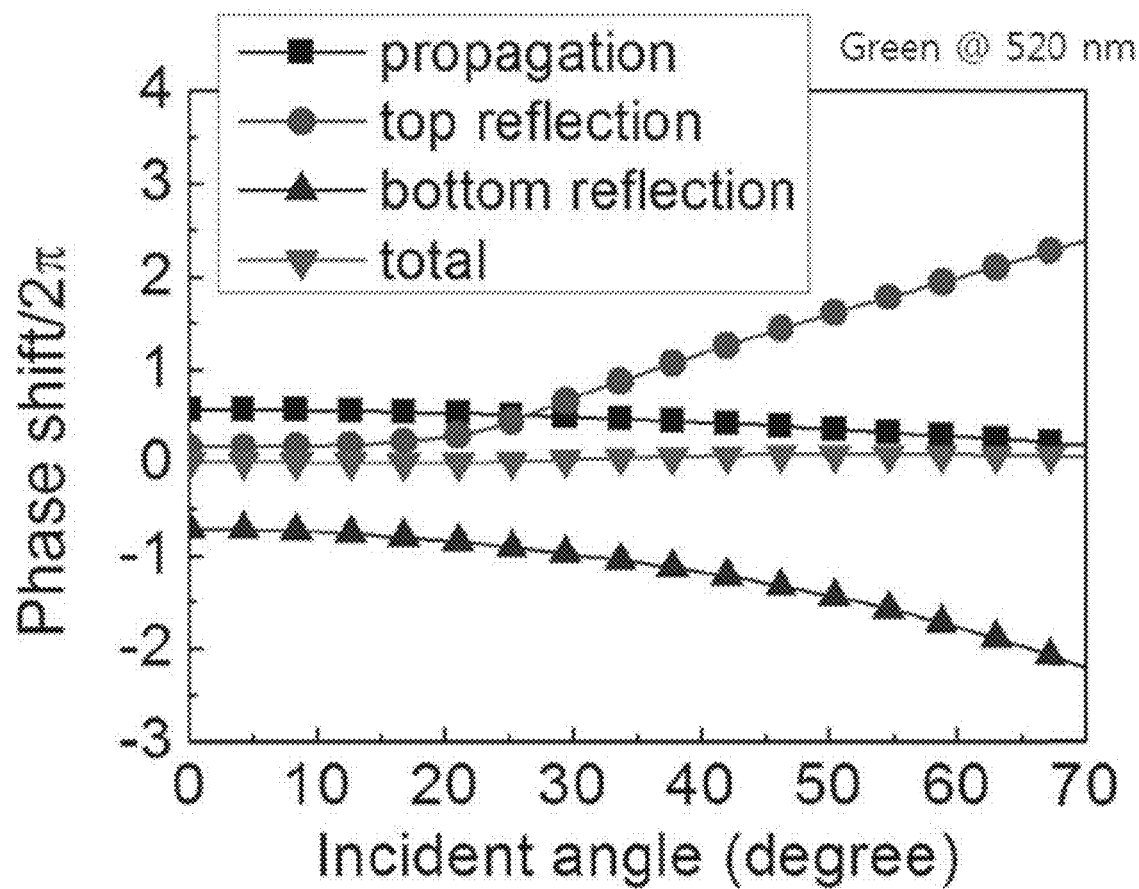
[FIG. 18B]

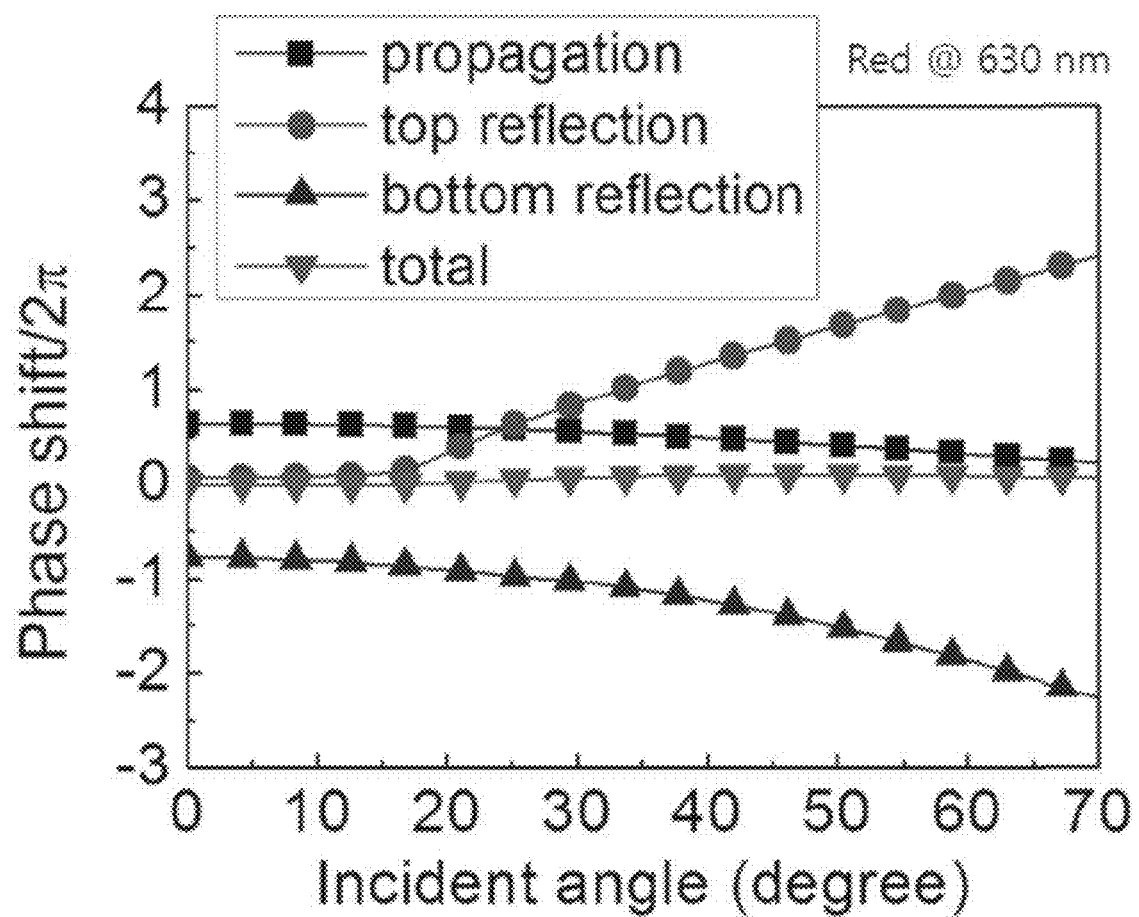
[FIG. 18C]

[FIG. 19A]
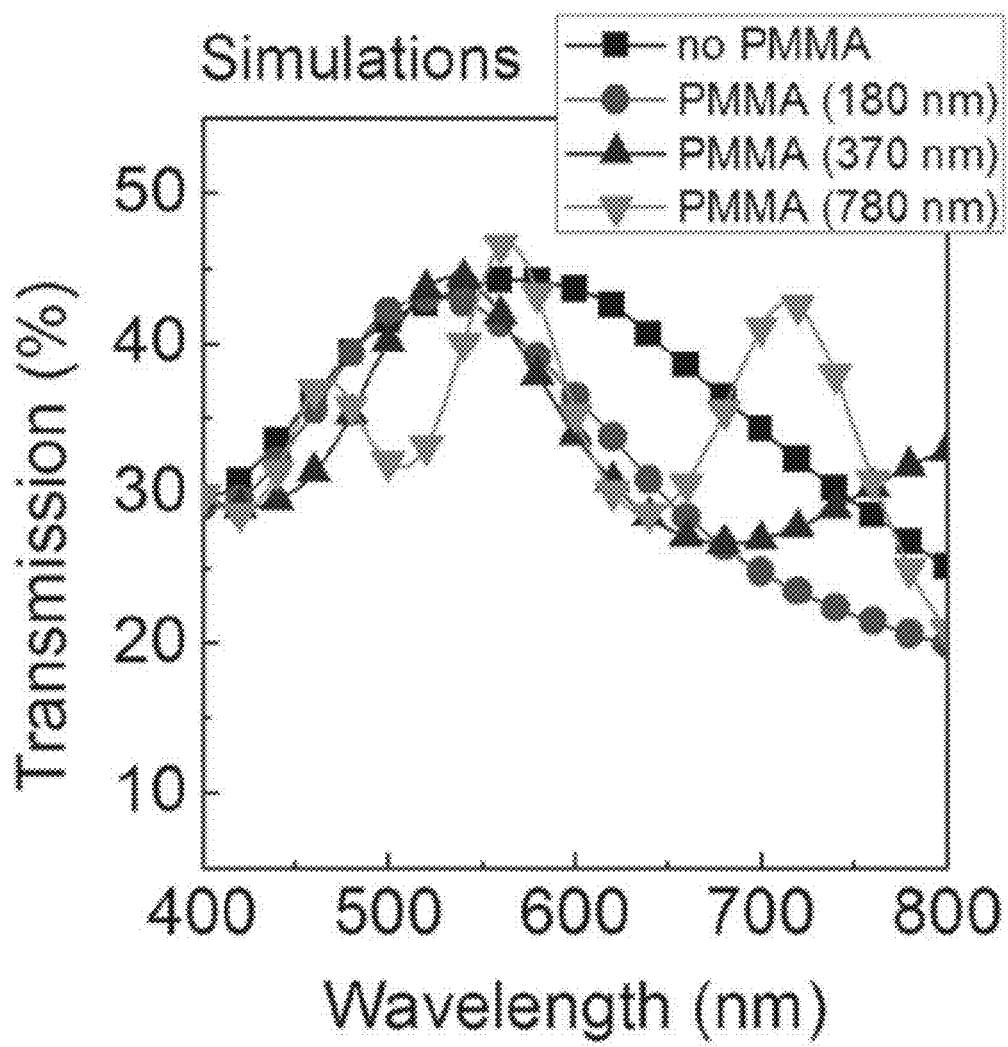

[FIG. 19B]
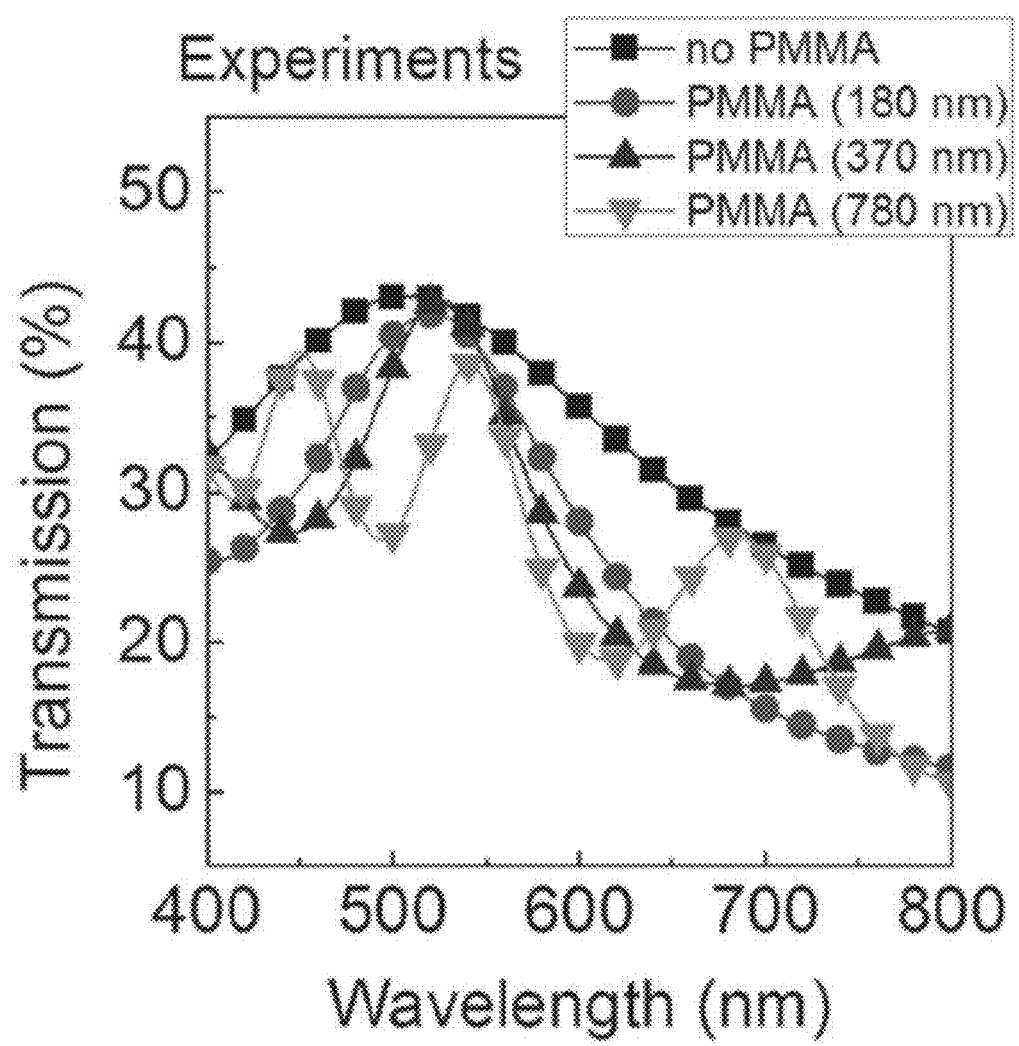

[FIG. 20]
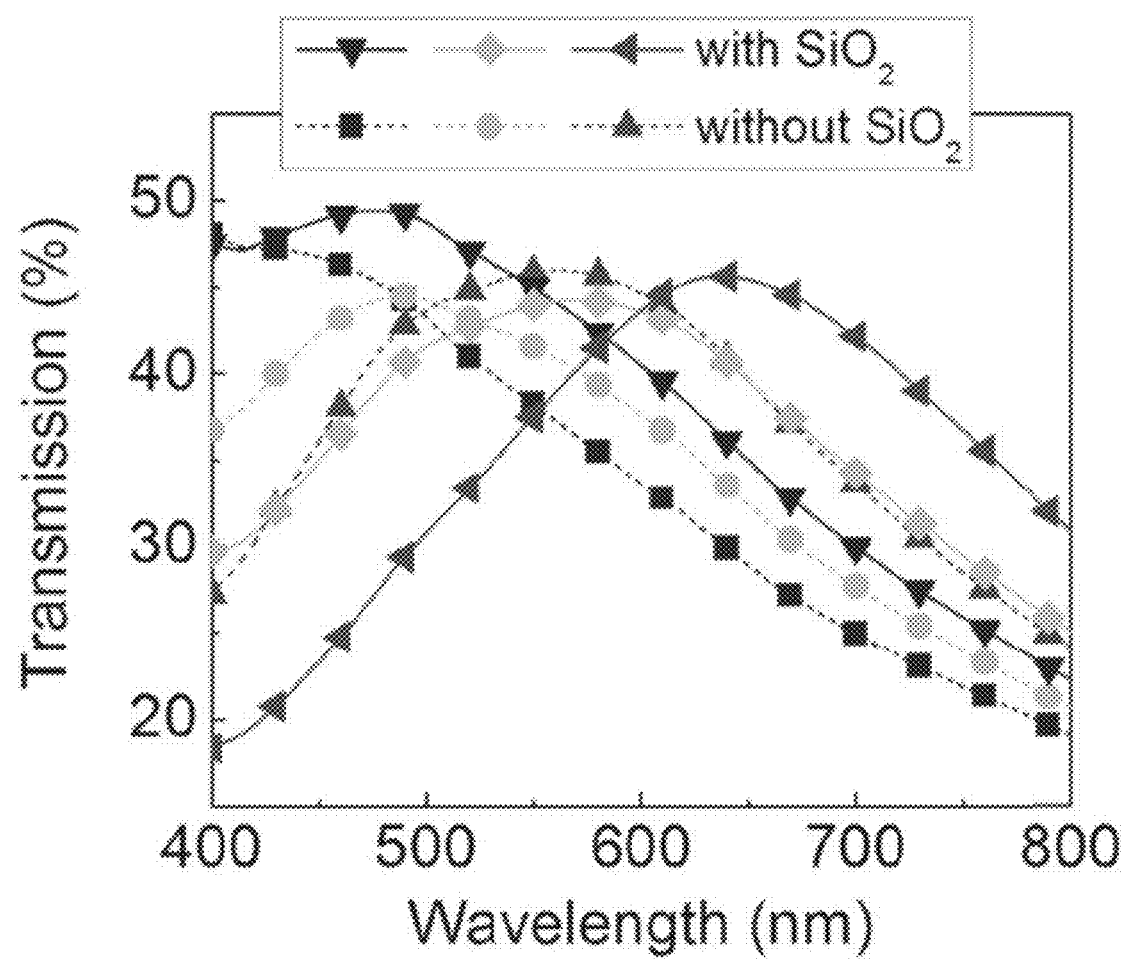

STRUCTURAL COLOR FILTER AND METHOD OF MANUFACTURING THE STRUCTURAL COLOR FILTER

CROSS-REFERENCE TO RELATED APPLICATION

This application claims the benefit of Korean patent application No. 10-2017-0008528 filed on Jan. 18, 2017 and No. 10-2017-0008563 filed on Jan. 18, 2017, the entire content of which is incorporated herein by reference for all purposes as if fully set forth herein.

BACKGROUND

Field of the Present Disclosure

The present disclosure relates to a structural color filter independent from the angle of incidence of incident light, and a manufacturing method thereof.

Discussion of Related Art

Color filters are used in various technical fields such as liquid crystal display technology, optical measurement systems, light emitting diodes, CMOS image sensors and the like. In this connection, color filters based on organic dyes or chemical pigments are usually used. However, since dyes and pigments are sensitive to continuous ultraviolet irradiation, high temperature, and moisture, the color filters based on the organic dyes or chemical pigments have problems in that the performance thereof deteriorates rapidly. Further, in order to reduce the pixel size in such a conventional color filter, a complicated and highly accurate alignment process is indispensably required.

In order to solve the above-mentioned problems of the conventional color filters based on organic dyes or chemical pigments, structural color filters have received much attention in recent years. These structural color filters have the potential to achieve high efficiency, high resolution, small pixel size, long term stability and non-photobleaching. In such a structural color filter, up to now, in order to trigger one of the photonic resonance mode and the plasmonic resonance mode, silver (Ag) or gold (Au) nano-structures with a dimension smaller than the visible-light wavelength are used. Silver (Ag) and gold (Au) have low optical absorption loss in the visible-light region compared to other metals. However, silver (Ag) or gold (Au) are not applicable to current CMOS manufacturing methods, and they have a problem in that they are expensive. Further, structural color filters using silver (Ag) or gold (Au) have problems that exhibit poor performance efficiency and significant color degradation over time. The interband transition of the gold material occurs at 468 nm. The silver material may be oxidized or sulfated.

Therefore, aluminum (Al) is attracting attention as a substitute for silver (Ag) or gold (Au) materials. Aluminum (Al) is abundant, inexpensive, applicable to industrial manufacturing processes, and has excellent optical properties. Various structural color filters based on aluminum (Al) have been reported to date. However, recently, in such a structural color filter, some problems have been found to be solved. Specifically, it has a performance characteristic sensitive to the incident angle of light in color generation. In order to solve the sensitivity to the incident angle, various structural color filters have been proposed. However, most of these color filters use a multilayer thin film structure that is used to adjust the thickness of the dielectric or semiconductor layer for color adjustment. As a result, there is a problem that three independent lithography processes are required when patterning each color filter on a pixel basis.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The purpose of the present disclosure is to provide a structural color filter including ultra-thin semiconductor gratings, whereby the filter may generate a constant color even when incident angles of incident light-beams change.

Another object of the present disclosure is to provide a method of manufacturing the structural color filter.

In a first aspect of the present disclosure, there is provided a structural color filter comprising: a substrate; a metal layer disposed on the substrate; and semiconductor gratings disposed on the metal layer, wherein each of the semiconductor gratings is elongated in a first direction, wherein the semiconductor gratings are arranged to be spaced apart from each other in a second direction perpendicular to the first direction, wherein the semiconductor gratings have the same thickness, wherein the thickness is smaller than a wavelength of visible-light.

In one embodiment of the first aspect, each of the semiconductor gratings is made of a semiconductor material having a band-gap corresponding to an energy of red or near-infrared light.

In one embodiment of the first aspect, the metal layer is made of aluminum (Al) or silver (Ag), and each of the semiconductor gratings is made of amorphous silicon.

In one embodiment of the first aspect, the filter further comprises polarizing means disposed on each of the semiconductor gratings, wherein the polarizing means is configured to polarize the incident light-beam in a TE (transverse electric) polarized manner.

In one embodiment of the first aspect, the filter further comprises a metal coating layer coated on a top face of each of the semiconductor gratings.

In one embodiment of the first aspect, the semiconductor gratings comprise first to third semiconductor gratings respectively disposed in different first to third regions on the metal layer, wherein the first to third semiconductor gratings have different first to third duty cycles, respectively.

In one embodiment of the first aspect, the first semiconductor gratings are spaced apart from each other by a first spacing in the second direction, the second semiconductor gratings are spaced apart from each other by a second spacing in the second direction, and the third semiconductor gratings are spaced apart from each other by a third spacing in the second direction.

In one embodiment of the first aspect, each of the first semiconductor gratings has a first width, wherein each of the second semiconductor gratings has a second width different from the first width, wherein each of the third semiconductor gratings has a third width different from the first and second widths.

In one embodiment of the first aspect, each of the first to third semiconductor gratings has a thickness equal to or greater than 20 nm and equal to or less than 60 nm.

In one embodiment of the first aspect, each of the first to third semiconductor gratings is made of amorphous silicon, wherein the first duty cycle has a value of 0.20 to 0.25, the second duty cycle has a value of 0.40 to 0.45, and the third duty cycle has a value of 0.57 to 0.62, wherein yellow, magenta, and cyan colors are rendered by the first to third semiconductor gratings, respectively. In one embodiment of the first aspect, the filter further comprises a transparent optical spacer layer disposed between the metal layer and the semiconductor gratings, wherein the semiconductor gratings comprise first to third semiconductor gratings respectively disposed in different first to third regions on the spacer layer, wherein the first to third semiconductor gratings have different first to third duty cycles, respectively.

In one embodiment of the first aspect, the substrate is transparent, and the metal layer is made of silver (Ag) or aluminum (Al), and the metal layer has a thickness of 1 nm or more and 40 nm or less.

In one embodiment of the first aspect, each of the first to third semiconductor gratings has a thickness of 5 nm or more and 60 nm or less.

In one embodiment of the first aspect, the optical spacer layer has a thickness of 10 nm or more and 40 nm or less.

In one embodiment of the first aspect, the filter further comprises a transparent polymeric protective film disposed on the spacer layer to cover the semiconductor gratings.

In one embodiment of the first aspect, the polymeric protective film has a thickness of 10 nm or more and 200 nm or less.

In a second aspect of the present disclosure, there is provided a method for manufacturing a structural color filter, the method comprising: forming a metal layer on a substrate; forming a resist thin-film on the metal layer; patterning the resist thin-film using a nano-imprinting method such that the metal layer is exposed and a resist pattern having linear grooves spaced from each other is defined; depositing a semiconductor material layer on the metal layer having the resist pattern formed thereon, wherein the semiconductor material layer has a thickness smaller than a wavelength of visible-light; and removing the resist pattern to form semiconductor gratings corresponding to the linear grooves respectively, wherein the linear grooves comprise: a plurality of first linear grooves located in a first region on the metal layer, each first groove having a first width; a plurality of second linear grooves located in a second region on the metal layer other than the first region, each second groove having a second width different from the first width; and a plurality of third linear grooves located in a third region on the metal layer other than the first and second regions, each third groove having a third width different from the first and second widths.

In one embodiment of the second aspect, patterning the resist thin-film comprises: compressing a mold onto the resist thin-film to form the linear grooves in the resist thin-film, wherein the mold has linear protrusions corresponding to the linear grooves respectively; selectively forming a metal protective film on sidewall faces of the linear grooves using an angled deposition method; and etching bottom faces of the linear grooves using reactive ion etching.

In one embodiment of the second aspect, the method further comprises, after forming the metal layer and before forming the resist thin-film, forming an optical spacer layer of a transparent dielectric on the metal layer, wherein forming the resist thin-film includes forming the resist thin-film on the optical spacer layer.

According to the structural color filter of the present disclosure, the structural color filter includes the metal layer, and the ultra-thin semiconductor gratings disposed thereon capable of absorbing visible light, the filter may produce a constant color regardless of the change in incident angle of the incident light-beam.

Further, because the thickness of the semiconductor gratings is the same, the semiconductor gratings for producing different colors may be formed via a single patterning process, so that manufacturing cost, time, and the like of the filter may be remarkably reduced.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 1A and FIG. 1B is a perspective view and a cross-sectional view illustrating a structural color filter according to the first embodiment of the present disclosure.

Referring to FIG. 1A and FIG. 1B, the structural color filter 100 according to the first embodiment may include a substrate 110, a metal layer 120, and semiconductor gratings 130.

FIG. 2 shows planar images of the yellow filter, the magenta filter and the cyan filter manufactured according to the first embodiment.

FIG. 3A and FIG. 3B show reflection-simulated spectral curves and measured spectral curves of structural colors respectively for the TE polarization incident light-beam perpendicularly incident on the yellow filter, magenta filter and cyan filter shown in FIG. 2. FIG. 3C shows a CIE 1931 color space chromaticity diagram of the color coordinates as calculated from the spectral curves of FIG. 3A and FIG. 3B.

FIG. 4 shows simulated reflection spectra (a, b, c), and measured reflection spectra (d, e, f) of the structural color filters shown in FIG. 2 based on the incident angles of the TE polarization light-beam.

FIG. 5 shows the colors produced by the structural color filters shown in FIG. 2 for incident light-beams with incident angles of 0, 25, 50 and 70 degrees.

FIG. 6A to FIG. 6C are graphs showing the phase shift as calculated from the effective medium theory based on the incidence angle of the incident light-beam at resonances for the yellow, magenta and cyan colors.

FIG. 7 shows the electric field strength at the resonance wavelengths (Y: 470 nm, M: 550 nm, C: 600 nm) and off-resonance wavelengths (Y: 600 nm, M: 700 nm, C: 750 nm) of each CMY color filter under TE polarization irradiation conditions.

FIG. 8 illustrates a simulated 2-D reflectance spectrum based on a period of semiconductor gratings with fixed width and thickness.

FIG. 9 illustrates a simulated 2-D reflectance spectrum based on the thickness of semiconductor gratings with the fixed period 220 nm and width 50 nm.

FIG. 10 illustrates a simulated 2-D reflectance spectrum based on the width of semiconductor gratings with the fixed period 400 nm and thickness 35 nm.

FIG. 11A and FIG. 11B show graphs indicating the reflection spectra (a) calculated for a filter with structure Ag/a-Si containing an Ag layer and a-Si gratings arranged on this layer, and the reflection spectrum (b) calculated for a filter having a structure Ag/a-Si/Ag, which further includes an Ag coating layer coated on the top face of the a-Si gratings.

FIG. 12A and FIG. 12B are a perspective view and a cross-sectional view illustrating a structural color filter according to a second embodiment of the present disclosure.

FIG. 13 illustrates planar images of the blue filter, green filter and red filter manufactured according to the second embodiment.

FIG. 14A and FIG. 14B show the simulated transmission spectrum and the measured transmission spectrum of the structural colors for the TE polarization incident light-beam perpendicularly incident on the filters shown in FIG. 13.

FIG. 15 illustrates a diagram showing the distribution of electric field strength at resonance wavelengths (B: 450 nm, G: 520 nm, R: 630 nm) and off-resonance wavelengths (B: 800 nm, G: 800 nm, R: 800 nm) of each of the blue, green and red filters as shown in FIG. 13 under the TE polarization irradiation condition.

FIG. 16 shows a graph of measured peak transmission and resonance wavelength of the blue, green and red filters as shown in FIG. 13 based on the radius of curvature thereof.

FIG. 17 shows simulated transmission spectra (a, b, c) and measured transmission spectra (d, e, f) for the blue, green and red filters shown in FIG. 13, based on the angle of incidence of TE polarization light beams.

FIG. 18A to FIG. 18C are graphs showing the phase shift at the resonance wavelength for the blue, green and red colors, as calculated using the effective medium theory based on the incident angle of incident light-beams.

FIG. 19A and FIG. 19B illustrate graphs showing simulated results and measured results of the green filter transmittance based on the presence or absence and thickness of polymer protective films covering semiconductor gratings when TE polarization light beams are incident perpendicularly onto the green filter.

FIG. 20 is a graph showing the transmittance of blue, green and red filters based on the presence or absence of the $SiO_2$ optical spacer layer.

DETAILED DESCRIPTIONS

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

FIG. 1A and FIG. 1B is a perspective view and a cross-sectional view illustrating a structural color filter according to the first embodiment of the present disclosure.

Referring to FIG. 1A and FIG. 1B, the structural color filter 100 according to the first embodiment may include a substrate 110, a metal layer 120, and semiconductor gratings 130.

The metal layer 120 may be disposed on the substrate 110. The metal layer 120 may be formed of aluminum (Al), silver (Ag), or the like having excellent optical characteristics to reflect incident light-beams. For example, the metal layer 120 may comprise an aluminum (Al) layer.

In one embodiment, the structural color filter 100 according to the first embodiment may be a reflective structural color filter. In this case, in order to prevent the incident light-beam from being transmitted through the metal layer 120 and causing light to be lost, the metal layer 120 may be relatively thicker than the semiconductor gratings 130. Further, the material of the substrate 110 is not particularly limited. For example, the substrate 110 may be formed of a transparent material that transmits light, or may be formed of an opaque material that does not transmit light.

In another embodiment, the structural color filter 100 according to the first embodiment may be a transmissive structural color filter. In this case, the metal layer 120 may be formed to a thickness of about 1 nm or more and 40 nm or less so that an incident light-beam transmits therethrough. Further, the substrate 110 may be formed of a transparent material. For example, the substrate 110 may be formed of glass or a polymer material. In one embodiment, when the transmissive structural color filter 100 is applied to a flexible device, the substrate 110 may be formed of a transparent polymer material such as PET.

The metal layer 120 may be formed on the substrate 110 by various methods. For example, the metal layer 120 may be formed on the substrate 110 using an electron beam deposition method.

The semiconductor gratings 130 are disposed on the metal layer 120. Each of the semiconductor gratings 130 is elongated in a first direction Y. The semiconductor gratings 130 may be periodically spaced apart in a second direction X perpendicular to the first direction Y. In one embodiment, the cross-section perpendicular to the first direction Y of each of the semiconductor gratings 130 has a rectangular shape. Each of the semiconductor gratings 130 may have a structure elongated in the first direction Y.

Each of the semiconductor gratings 130 may be formed of a semiconductor material having a band-gap configured to absorb light in a visible light region. Each of the semiconductor gratings 130 may have a thickness that is significantly smaller than the wavelength of visible light. In this case, the semiconductor gratings 130 and the cavities formed between the semiconductor gratings 130 may be regarded as a single optical medium layer having an effective refractive index ($n_m$) determined based on Equation 1 below for a TE (Transverse Electric) polarization optically oscillating in parallel with the semiconductor gratings 130:

$$n_{TE} = \frac{\sqrt{\varepsilon_1 f + \varepsilon_2(1-f)}}{\sqrt{1 + \frac{\pi^2}{3}(\varepsilon_1 f + \varepsilon_2(1-f))\left(\frac{f(1-f)P}{\lambda}\right)^2\left(\frac{\varepsilon_1 - \varepsilon_2}{\varepsilon_1 f + \varepsilon_2(1-f)}\right)}}$$ [Equation 1]

In Equation 1, f, P, $\varepsilon_1$ and $\varepsilon_2$ represent the duty cycle of the semiconductor grating, the period of the semiconductor grating, the permittivity of the semiconductor material, and the permittivity of air, respectively. In this case, the duty cycle f of the semiconductor grating represents the ratio (W/P) of the width w of the semiconductor grating to the period P of the semiconductor grating.

As may be seen from Equation 1, as the duty cycle of the semiconductor grating increases, the occupation percentage of the semiconductor gratings 130 increases. This increases the effective refractive index ($n_{TE}$) for the TE polarization of the optical medium layer defined by the semiconductor gratings 130 and the cavities formed therebetween. As a result, the resonance wavelength increases according to the effective medium theory.

When the semiconductor gratings 130 are formed of a semiconductor material having a band-gap capable of absorbing light of a visible-light region, and the semiconductor gratings 130 have a thickness that is significantly less than the visible-light wavelength, the sum of the phase shift of the light due to the reflection at the semiconductor/metal interface, the phase shift of the light due to the reflection at the air/semiconductor interface, and the phase shift of the light generated during propagation inside the semiconductor gratings is insignificant. This may result in strong optical resonance, exhibiting resonance wavelength properties that are not sensitive to the angle of incidence of the incident light-beam.

In one embodiment, the semiconductor gratings 130 may have a band-gap corresponding to the energy of the red or near-infrared light. If the band gap of the semiconductor material forming the semiconductor gratings 130 is too small, the semiconductor gratings 130 may have a large absorption coefficient for the entire visible light and cause a problem of low color purity. Conversely, if the band gap of the semiconductor material is too large, the semiconductor gratings 130 hardly absorb light in the visible-light region, and thus the optical resonance cannot be formed. Therefore, as long as a semiconductor material having a band-gap corresponding to the energy of red or near-infrared light is used for the semiconductor gratings 130, the material of the semiconductor gratings 130 is not particularly limited.

In one embodiment, the semiconductor gratings 130 may have a thickness of greater than about 20 nm and less than or equal to 60 nm. If the thickness of the semiconductor gratings 130 is 20 nm or less, the effective refractive index of the optical medium layer defined by the semiconductor gratings 130 and cavities formed therebetween is too small such that any resonance for the incident light-beam of the visible-light region may not occur. Conversely, when the thickness of the semiconductor gratings 130 exceeds 60 nm, the phase shift caused during propagation of the light in the semiconductor gratings 130 is too large to cause a problem that the resonance wavelength varies greatly depending on the incident angle of the incident light beam.

As described above, the effective refractive index of the optical medium layer defined by the semiconductor gratings and the cavities formed therebetween is adjusted based on the duty cycle of the semiconductor gratings 130 and, hence, the resonance wavelength of the optical medium layer is adjusted. Thus, various colors may be generated by controlling the duty cycle of the semiconductor gratings 130.

In one embodiment, the semiconductor gratings 130 may include first semiconductor gratings 130a, second semiconductor gratings 130b, and third semiconductor gratings 130c. The first semiconductor gratings 130a, second semiconductor gratings 130b and third semiconductor gratings 130c are disposed in different regions on the top face of the metal layer 120. The first to third semiconductor gratings 130a, 130b and 130c may have different duty cycles.

For example, the first semiconductor gratings 130a may be disposed on the first region A1 of the top face of the metal layer 120. For example, the second semiconductor gratings 130b may be disposed on a second region A2 different from the first region A1 of the top face of the metal layer 120. The third semiconductor gratings 130c may be disposed on a third region A3 different from the first and second regions A1 and A2 of the top face of the metal layer 120.

Each of the first semiconductor gratings 130a has a predetermined thickness T and first width W1. Each of the first semiconductor gratings 130a may have a structure elongated in the first direction Y. The first semiconductor gratings 130a may be periodically arranged so as to be spaced apart from each other by a first spacing in the second direction X. As a result, between the adjacent first semiconductor gratings 130a, a first cavity may be defined that is parallel to each of the first semiconductor gratings 130a and has the same thickness as each of the first semiconductor gratings 130a and a width corresponding to the first spacing.

Each of the second semiconductor gratings 130b extends in the first direction Y, like the first semiconductor gratings 130a. The second semiconductor gratings 130b may be periodically arranged in the second direction X to be spaced apart from each other by a second spacing. As a result, between adjacent second semiconductor gratings 130b, a second cavity may be formed which is formed parallel to the second semiconductor gratings 130b and has the same thickness as the second semiconductor gratings 130b and has a width corresponding to the second spacing. In this connection, each of the second semiconductor gratings 130b has the same thickness T as the first semiconductor gratings 130a but has a width or period different from that of the first semiconductor gratings 130a. Thus, the second semiconductor gratings 130b may have a different duty cycle than that of the first semiconductor gratings 130a.

Each of the third semiconductor gratings 130c extends in the first direction Y, like the first semiconductor gratings 130a. The third semiconductor gratings 130c may be periodically arranged in the third direction X to be spaced apart from each other by a third spacing. As a result, between adjacent third semiconductor gratings 130c, a third cavity may be formed which is formed parallel to the third semiconductor gratings 130c and has the same thickness as the third semiconductor gratings 130c and has a width corresponding to the third spacing. In this connection, each of the third semiconductor gratings 130c has the same thickness T as the first semiconductor gratings 130a but has a width or period different from that of the first semiconductor gratings 130a. Thus, the third semiconductor gratings 130c may have a different duty cycle than that of the first semiconductor gratings 130a and that of the second semiconductor gratings 130b.

For convenience of illustration, 'period' and 'duty cycle' for the first semiconductor gratings 130a are referred to as a 'first period P1' and a 'first duty cycle'; 'period' and 'duty cycle' for the second semiconductor gratings 130a are referred to as 'second period P2' and 'second duty cycle'; and 'period' and 'duty cycle' for the third semiconductor gratings 130c are referred to as 'third period P3' and 'third duty cycle'.

In one embodiment, in the first region A1 in which the first semiconductor gratings 130a are disposed, a color of a first wavelength range having a first central wavelength may be generated; in the second region A2 where the second semiconductor gratings 130b are disposed, a color of a second wavelength range having a second central wavelength greater than the first central wavelength may be generated; and in the third region A3 where the third semiconductor gratings 130c are disposed, a third wavelength range color having a third central wavelength greater than the first and second central wavelengths may be generated.

In this case, the first duty cycle of the first semiconductor gratings 130a may be smaller than the second and third duty cycles of the second and third semiconductor gratings 120b and 120c; and the second duty cycle of the second semiconductor gratings 130b may be less than the third duty cycle of the third semiconductor gratings 130c. To this end, the width W1 of each of the first semiconductor gratings 130a may be less than the widths W2 and W3 of the second and third semiconductor gratings 130b and 130c; and the width of each of the second semiconductor gratings 130b may be smaller than the width W3 of each of the third semiconductor gratings 130c.

For example, in the first to third regions A1, A2, and A3, yellow, magenta, and cyan colors may be generated respectively. In this case, the first duty cycle may have a value between about 0.20 and 0.25; the second duty cycle may have a value of about 0.40 to 0.45; and the third duty cycle may have a value of about 0.57 to 0.62.

The semiconductor gratings 130 may be formed via a nano-imprint lithography process. In this connection, when the semiconductor gratings 130 include the first to third semiconductor gratings 130a, 130b, and 130c, the first to third semiconductor gratings 130a, 130b, and 130c may be formed via one patterning process since they have the same thickness.

In one embodiment, in order to form the semiconductor gratings 130, first a polymeric material such as PMMA is spin cast to form a resist thin film on the metal layer 120. Thereafter, the resist thin film may be patterned to form a resist pattern having linear grooves corresponding to the semiconductor gratings 130 and exposing the metal layer 120.

For example, a $SiO_2$ mold having linear protrusions corresponding to the linear grooves is pressed on the resist thin film, and, thus, the linear grooves are formed in the resist thin film. Thereafter, a chromium protective film is selectively formed only on the sidewall face of the linear grooves via an angled deposition method. Thereafter, the bottom face of the linear grooves may be etched using $O_2$ reactive ion etching to form the resist pattern.

Subsequently, a semiconductor material such as amorphous silicon a-Si is deposited on the metal layer 120 on which the resist pattern is formed. Thereafter, the semiconductor gratings 130 may be formed on the metal layer 120 by removing the resist pattern.

The structural color filter 100 according to the first embodiment may further include polarizing means (not shown) arranged on the semiconductor gratings 130 to TE-polarize an incident light beam.

When placing the polarizing means on the semiconductor gratings 130, only the TE polarized light-beam is incident on the optical medium layer defined by the semiconductor gratings 130 and the cavities formed between the semiconductor gratings 130. Thus, the electric field may fundamentally block plasmonic resonance caused by transverse magnetic (TM) polarization oscillating in a direction perpendicular to the semiconductor gratings 130. As a result, the variation of the resonance wavelength based on the incident angle of the incident light-beam may be further reduced.

Further, the structural color filter 100 according to the first embodiment may further include a metal coating layer (not shown) covering the top faces of the semiconductor gratings 130.

When a metal coating layer capable of reflecting light is formed on the top face of the semiconductor gratings 130, the resonance wavelength does not change but the resonance width is reduced. Thereby, the purity of the generated color can be improved. In one embodiment, the metal coating layer may be formed of silver (Ag) or aluminum (Al).

Since the structural color filter according to this embodiment includes the metal layer, and the ultra-thin semiconductor gratings disposed thereon capable of absorbing visible light, the filter may produce a constant color regardless of the change in incident angle of the incident light-beam.

Further, because the thickness of the semiconductor gratings is the same, the semiconductor gratings for producing different colors may be formed via a single patterning process, so that manufacturing cost, time, and the like of the filter may be remarkably reduced.

FIG. 2 shows planar images of the yellow filter, the magenta filter and the cyan filter manufactured according to the first embodiment. As shown in the left insets of FIG. 2, the yellow filter is manufactured by forming a-Si gratings having a width of 50 nm on the Al layer in a period of 220 nm; the magenta filter is fabricated by forming a-Si gratings having a width of 120 nm on the Al layer in a period of 280 nm; and the cyan filter is manufactured by forming a-Si gratings having a width of 250 nm on the Al layer in a period of 420 nm.

As shown in the right insets of FIG. 2, it may be seen that the yellow filter, the magenta filter, and the cyan filter generate reflection type yellow, magenta and cyan colors having excellent purity and high luminance over a large area of 1 cm×1 cm for a TE polarization incident light-beam incident perpendicular thereto.

FIG. 3A and FIG. 3B show reflection-simulated spectral curves and measured spectral curves of structural colors respectively for the TE polarization incident light-beam perpendicularly incident on the yellow filter, magenta filter and cyan filter shown in FIG. 2. FIG. 3C shows a CIE 1931 color space chromaticity diagram of the color coordinates as calculated from the spectral curves of FIG. 3A and FIG. 3B.

Referring to FIG. 3A and FIG. 3B, from the simulation results, the resonance wavelengths for the yellow, magenta and cyan colors were 595 nm, 550 nm and 470 nm, respectively for the yellow filter, the magenta filter and the cyan filter. From the measurement results, the resonance wavelengths for yellow, magenta and cyan colors were 610 nm, 520 nm and 445 nm respectively for the yellow filter, the magenta filter and the cyan filter. Although there was a slight difference in the resonance wavelength between the simulation results and the measurement results, the simulation results and measurement results showed substantial match with each other. In this connection, a slight inconsistency between the simulation result and the measurement result is attributed to the change in the refractive index due to the deviation of the width, thickness, etc. of the a-Si gratings as generated in the actual manufacture of the filter from those in the simulation.

Referring to FIG. 3C, it is seen that the color coordinates (square) calculated from the simulation results, and the color coordinates (circular) calculated from the measurement results match with the structural color of each filter as shown in FIG. 2.

FIG. 4 shows simulated reflection spectra (a, b, c), and measured reflection spectra (d, e, f) of the structural color filters shown in FIG. 2 based on the incident angles of the TE polarization light-beam. FIG. 5 shows the colors produced by the structural color filters shown in FIG. 2 for incident light-beams with incident angles of 0, 25, 50 and 70 degrees.

Referring to FIG. 4, it may be seen that the simulated and measured results for each structural color filter are in good agreement with each other. Further, it may be confirmed that as for each structural color filter, the resonance wavelength thereof is kept constant over a wide incident angle region up to 70°.

Further, referring to FIG. 5, it may be seen that the color generated by the structural color filters hardly changes even when the incident angle of the incident light beam changes.

FIG. 6A to FIG. 6C are graphs showing the phase shift as calculated from the effective medium theory based on the incidence angle of the incident light-beam at resonances for the yellow, magenta and cyan colors.

Referring to FIG. 6A to FIG. 6C, it is seen that even though the angle of incidence of the incident light-beam varies at the resonance for yellow, magenta and cyan colors, the overall phase changes thereof are almost constant at zero. This is because the thickness of the semiconductor gratings is significantly smaller than the wavelength of the incident light-beam, and, thus, not only the phase shift of the light as generated during propagation thereof in these gratings is small, but also, the phase-shift of light during propagation thereof in these semiconductor gratings is canceled by the phase-shift occurring from reflection at the air/semiconductor interface, and the phase-shift occurring from reflection at the semiconductor/metal interface. From such a result, it may be seen that the structural color filter according to the present disclosure may render the uniform generated color even when the incident angle of incident light-beam thereto changes.

FIG. 7 shows the electric field strength at the resonance wavelengths (Y: 470 nm, M: 550 nm, C: 600 nm) and off-resonance wavelengths (Y: 600 nm, M: 700 nm, C: 750 nm) of each CMY color filter under TE polarization irradiation conditions.

Referring to FIG. 7, it may be seen that the incident light-beam is strongly confined within the semiconductor gratings at the resonance wavelength where destructive interference occurs due to multiple reflections. In this case, strong light absorption and low light reflection due to semiconductor gratings occur. However, although the electric field of the incident light-beam is well constrained within the semiconductor gratings, since the a-Si material has a larger optical absorption constant at a shorter wavelength, the field strength for the yellow appearing at 470 nm (i.e. yellow in the color map showing the wave intensity) is much lower than the field strength for magenta and cyan (i.e. dark red in the color map).

In contrast, at the off-resonance wavelength, the incident light-beam is strongly reflected from the surface of the metal layer. This is because the interaction between incident light and semiconductor gratings is weak.

FIG. 8 illustrates a simulated 2-D reflectance spectrum based on a period of semiconductor gratings with fixed width and thickness.

Referring to FIG. 8, it may be seen that the resonance wavelength hardly changes even when the period of the semiconductor gratings changes. This result is clearly different from the result resulting from the structural color filters based on plasmonic resonance or photonic resonance as previously reported. This indicates that the structural color filters in accordance with the present disclosure may not exhibit plasmonic resonance or photonic resonance that is otherwise sensitive to incident angles of the incident light-beam thereto. Thus, it may be seen that the structural color filter according to the present disclosure is not sensitive to incident angles of the incident light-beam thereto. However, as the period of the semiconductor gratings increases, the resonance becomes sharp. This is probably because the electric fields inside the adjacent semiconductor gratings easily overlap each other when the period of the semiconductor gratings is small.

FIG. 9 illustrates a simulated 2-D reflectance spectrum based on the thickness of semiconductor gratings with the fixed period 220 nm and width 50 nm.

As shown in FIG. 9, it may be seen that as the thickness of the semiconductor grating increases, the resonance wavelength increases. This is because the effective refractive index of the optical medium increases as the thickness of the semiconductor grating increases. On the other hand, when the thickness of the semiconductor gratings is less than 20 nm, no resonance appears to occur in the visible-light region. This is because the effective refractive index becomes too low when the thickness of the semiconductor gratings is less than 20 nm. Therefore, the thickness of the semiconductor gratings is preferably 20 nm or more.

FIG. 10 illustrates a simulated 2-D reflectance spectrum based on the width of semiconductor gratings with the fixed period 400 nm and thickness 35 nm.

Referring to FIG. 10, it may be confirmed that the resonance wavelength increases as the width of the semiconductor gratings increases.

FIG. 11A and FIG. 11B show graphs indicating the reflection spectra calculated for a filter with structure Ag/a-Si containing an Ag layer and a-Si gratings arranged on this layer, and the reflection spectrum calculated for a filter having a structure Ag/a-Si/Ag, which further includes an Ag coating layer coated on the top face of the a-Si gratings.

Referring to FIG. 11A and FIG. 11B, when the metal coating layer is formed on the top face of the semiconductor gratings to reflect the light, the resonance wavelength does not change but the resonance width becomes narrower.

FIG. 12A and FIG. 12B are a perspective view and a cross-sectional view illustrating a structural color filter according to a second embodiment of the present disclosure.

Referring to FIG. 12A and FIG. 12B, the structural color filter 200 according to the second embodiment may include a substrate 210, a metal layer 220, semiconductor gratings 230, and an optical spacer layer 240. The structural color filter 200 according to the second embodiment may be a transmission type structural color filter.

The substrate 210 may be formed of a transparent material.

For example, the substrate 210 may be formed of glass or a polymer material. In one embodiment, when the structural color filter 200 is applied to a flexible device, the substrate 210 may be formed of a transparent polymer material such as PET.

The metal layer 220 may be disposed on the substrate 210 and may generate optical resonance together with the semiconductor gratings 230. The metal layer 220 may be formed of silver (Ag), aluminum (Al), or the like having excellent optical property. In order to improve the transmittance of the incident light-beam, the metal layer 220 may be formed with a thickness of about 1 nm or more and 40 nm or less.

The metal layer 220 may be formed on the substrate 210 in various ways. In one embodiment, the metal layer 220 may be formed on the substrate 210 using an electron beam deposition method. In order to improve the uniformity of the metal layer 220, a seed layer of a first metal may be formed on the substrate 210, and then the metal layer 220 may be formed on the seed layer. For example, when the metal layer 220 is formed of silver (Ag), a copper (Cu) seed layer having a thickness of about 1 nm is formed on the substrate 210 using an electron beam evaporation method, and, thereafter, a silver (Ag) metal layer 220 may be formed on the seed layer using an electron beam deposition method.

The semiconductor gratings 230 are substantially the same as the semiconductor gratings 130 of the structural color filter 100 according to the first embodiment described with reference to FIG. 1A and FIG. 1B except the thickness thereof. Therefore, redundant detailed description of the semiconductor gratings 230 is omitted.

In one embodiment, the semiconductor gratings 230 may have a thickness of about 5 nm inclusive to about 60 nm inclusive. If the thickness of the semiconductor gratings 230 is less than 5 nm, the effective refractive index of the optical medium layer is too small, and, thus, no resonance may occur for the incident light-beam in the visible-light region. To the contrary, if the thickness of the semiconductor gratings 230 exceeds 60 nm, the phase-shift of the light beam caused while the light beam propagates inside the semiconductor gratings 230 is too large, and, thus, the resonance wavelength may vary greatly depending on the incident angle of the incident light beam.

The semiconductor gratings 230 may include first semiconductor gratings 230a, second semiconductor gratings 230b, and third semiconductor gratings 230c formed in different regions, i.e., first to third regions A1, A2, and A3, respectively. Hereinafter, for convenience of illustration, the period and the duty cycle for the first semiconductor gratings 230a may be referred to as a 'first period P1' and a 'first duty cycle W1/P1'; the period and the duty cycle for the second semiconductor gratings 230b are referred to as a 'second period P2' and a 'second duty cycle W2/P2'; and the period and the duty cycle for the third semiconductor gratings 230c are referred to as a 'third period P3' and 'third duty cycle W3/P3'.

In one embodiment, in the first to third regions A1, A2, and A3, blue, green, and red colors may be respectively generated. In this regard, when the first to second semiconductor gratings 230a, 230b, and 230c are all formed of amorphous silicon, the first duty cycle may have a value of about 0.12 to 0.20, the second duty cycle may have a value of about 0.35 to 0.43, and the third duty cycle may have a value of about 0.79 to 0.87.

The optical spacer layer 240 may be disposed between the metal layer 220 and the semiconductor gratings 230 and may be formed to cover the entire top face of the metal layer 220. The optical spacer layer 240 may be formed of a transparent dielectric material. For example, the optical spacer layer 240 may be formed of silicon oxide such as $SiO_2$.

When the optical spacer layer 240 is disposed between the metal layer 220 and the semiconductor gratings 230, this compensates for the phase mismatch between the light beams, and, thus, the ohmic loss in the metal layer 220 is mitigated, so that the interaction between the light beams is improved, and thus, the light transmittance may be improved. Further, in the second embodiment, the optical spacer layer 240 may prevent oxidation of the metal layer 220, which may otherwise be caused during the $O_2$ reactive ion etching process during the fabrication of the structural color filter 200.

In one embodiment, the optical spacer layer 240 may have a thickness of about 10 nm inclusive to about 40 nm inclusive. If the thickness of the optical spacer layer 240 is less than 10 nm, the underlying thin metal layer cannot be efficiently protected from $O_2$ reactive ion etching, which may lead to oxidation of the metal layer. To the contrary, if the thickness of the optical spacer layer 240 exceeds 40 nm, the reflection at the underlying metal layer 220 becomes too weak, and, at the same time, the resonance in the optical spacer layer 240 should be taken into account. Due to the latter fact, the effect of the overall resonance required to realize the color is weakened, and, thus, the problem that the color purity is lowered may occur.

The optical spacer layer 240 may be formed on the metal layer 220 using a vapor deposition method, and the semiconductor gratings 230 may be formed on the optical spacer layer 240 using a nano-imprinting lithography process. In this case, when the semiconductor gratings 230 include the first to third semiconductor gratings 230a, 230b, and 230c, the first to third semiconductor gratings 230a, 230b, and 230c may be formed using a single patterning process since the first to third semiconductor gratings 230a, 230b, and 230c have the same thickness.

In one embodiment, the structural color filter 200 according to the second embodiment may further include a polymer protective layer (not shown) formed on the optical spacer layer 240 to cover the semiconductor gratings 230.

When the semiconductor gratings 230 are oxidized, the effective refractive index of the optical medium layer is changed so that the resonance wavelength may be changed. For this reason, the polymer protective layer may prevent the semiconductor gratings 230 from being oxidized. Further, when the thickness of the polymer protective film is optimized, a larger amount of incident light-beams may be subjected to a constructive interference in the resonant wavelength due to the impedance matching, which may improve color purity.

The polymer protective film may be formed of a transparent polymer material. For example, the polymeric protective film may be formed of PMMA. Further, considering the color purity and the resulting color of the structural color filter 200 based on the thickness of the polymer protective film, it is preferable that the polymer protective film is formed with a thickness of about 300 nm or less. In the case of using the polymer protective film having a thickness exceeding 300 nm, the influence of the additional Fabry-Perot resonance phenomenon generated by the polymer protective film becomes so great that the existing single resonance may be changed into a plurality of resonances. For example, the polymer protective film may be formed to a thickness of about 10 nm or more and 200 nm or less.

Alternatively or additionally, the structural color filter 200 according to the second embodiment may further include polarizing means (not shown) disposed on the semiconductor gratings 230 for TE polarization of the incident light beam, and/or a metal coating layer (not shown) covering the top faces of the semiconductor gratings 230. The polarizing means (not shown) and the metal coating layer (not shown) may be same as those described above with reference to the structural color filter 100 according to the first embodiment described above with reference to FIG. 1A and FIG. 2B. Accordingly, additional redundant descriptions of the polarizing means (not shown) and the metal coating layer (not shown) are omitted.

Since the structural color filter according to this embodiment includes the metal layer, and the ultra-thin semiconductor gratings disposed thereon capable of absorbing visible light, the filter may produce a constant color regardless of the change in incident angle of the incident light-beam. Further, because the thickness of the semiconductor gratings is the same, the semiconductor gratings for producing different colors may be formed via a single patterning process, so that manufacturing cost, time, and the like of the filter may be remarkably reduced. Further, since the structural color filter according to the second embodiment is not sensitive to the incidence angle of the incident light, the structural color filter may be effectively applied to a flexible element and the like.

FIG. 13 illustrates planar images of the blue filter, green filter and red filter manufactured according to the second embodiment. As shown in the left insets of FIG. 13, each of the blue, green and red filters may include a stack of the Ag layer of 20 nm thickness on the PET substrate, the 25 nm thick $SiO_2$ layer on the Ag layer, and 10 nm thick a-Si gratings on the $SiO_2$ layer. In these filters, the a-Si gratings may be all formed with a period of 180 nm. Further, each of the a-Si gratings of the blue filter are formed to have a width of 30 nm; each of the a-Si gratings of the green filter are formed to have a width of 70 nm; and each of the a-Si gratings of the red filter are formed to have a width of 150 nm.

Referring to FIG. 13, it may be seen that the blue, green and red filters may produce transmissive blue, green and red colors having excellent purity and high luminance over a large area for a TE polarization incident light-beam incident perpendicularly to the filters. That is, as the width W of the semiconductor grating is increased, the effective refractive index of the optical medium layer is increased based on Equation 1.

This increases the resonance wavelength. Therefore, it may be seen that the blue, green and red colors may be effectively generated by changing the width W of the semiconductor grating, that is, the duty cycle of the semiconductor grating.

FIG. 14A and FIG. 14B show the simulated transmission spectrum and the measured transmission spectrum of the structural colors for the TE polarization incident light-beam perpendicularly incident on the filters shown in FIG. 13.

Referring to FIG. 14A and FIG. 14B, it may be seen that the measured transmission spectrum is in good agreement with the simulated transmission spectrum. However, in the simulated spectrum, the transmission resonances appeared at 640 nm, 560 nm and 475 nm wavelengths for generation of red, green and blue, respectively. In the measured spectrum, transmission resonances appeared at 630 nm, 520 nm and 450 nm wavelengths respectively for the generation of red, green and blue. The difference between the simulated and measured results at the resonance wavelengths is considered to be mainly due to the reduction of the refractive index due to the oxidation of a-Si gratings. Additionally, it is considered that the difference between the simulated and measured results at the resonance wavelengths is considered to be due to the difference in a layer thickness, a grating width, and a surface roughness caused during manufacturing of the filters.

FIG. 15 illustrates a diagram showing the distribution of electric field strength at resonance wavelengths (B: 450 nm, G: 520 nm, R: 630 nm) and off-resonance wavelengths (B:

800 nm, G: 800 nm, R: 800 nm) of each of the blue, green and red filters as shown in FIG. 13 under the TE polarization irradiation condition.

Referring to FIG. 15, the electric field is strongly concentrated into the semiconductor gratings at the resonance wavelength causing the light transmission, while the electric field is reflected in the direction of the incident medium at the off-resonance wavelengths.

FIG. 16 shows a graph of measured peak transmission and resonance wavelength of the blue, green and red filters as shown in FIG. 13 based on the radius of curvature thereof.

Referring to FIG. 16, even when the bending degrees of the blue, green and red filters are changed and thus the radii of curvatures of these filters are changed, the transmittance of the light and the resonance wavelength thereof are almost unchanged. Therefore, it may be confirmed that when the transmission type structural color filters according to the present disclosure are applied to a flexible device or the like, the filters can effectively perform their functions.

FIG. 17 shows simulated transmission spectra (a, b, c) and measured transmission spectra (d, e, f) for the blue, green and red filters shown in FIG. 13, based on the angle of incidence of TE polarization light beams.

Referring to FIG. 17, it may be seen that the simulated and measured results for each structural color filter are in good agreement. Further, it may be confirmed that each structural color filter has the resonance wavelength which is maintained constant in a wide incident angle region up to 60°.

FIG. 18A to FIG. 18C are graphs showing the phase shift at the resonance wavelength for the blue, green and red colors, as calculated using the effective medium theory based on the incident angle of incident light-beams.

Referring to FIG. 18A to FIG. 18C, it may be seen that the overall phase variation is almost zero even though the angle of incidence of the incident light-beam changes at the resonance wavelength for the blue, green and red colors. This is because the thickness of the semiconductor gratings is significantly smaller than the wavelength of the incident light-beam, and, thus, not only the phase shift of the light as generated during propagation thereof in these gratings is small, but also, the phase-shift of light during propagation thereof in these semiconductor gratings is canceled by the phase-shift occurring from reflection at the air/semiconductor interface, and the phase-shift occurring from reflection at the semiconductor/metal interface. From such a result, it may be seen that the structural color filter according to the present disclosure may render the uniform generated color even when the incident angle of incident light-beam thereto changes.

FIG. 19A and FIG. 19B illustrate graphs showing simulated results and measured results of the green filter transmittance based on the presence or absence and thickness of polymer protective films covering semiconductor gratings when TE polarization light beams are incident perpendicularly onto the green filter. FIG. 19 shows the results for a green filter (black curve) without a PMMA protective film, a green filter (red curve) with a thickness of 180 nm of the PMMA protective film, a green filter (blue curve) with a protective film thickness of 370 nm, and a green filter (dark yellow curve) having a protective film thickness of 780 nm.

Referring to FIG. 19A and FIG. 19B, it may be seen that the simulated and measured results are in good agreement. Further, the resonance of the filter with PMMA protective film was narrower than that of the filter without PMMA protective film. From this, it may be seen that color purity may be improved when the polymeric protective film is formed. This is because a larger amount of incident light-beams may be subjected to constructive interference in the resonant wavelength due to impedance matching.

Further, it may be seen that in the case of a filter having a PMMA protective film of 780 nm thickness, the single resonance is split into three different resonance modes (resonances at 465 nm, 565 nm and 715 nm) in the PMMA protective film. The resonance at the 465 nm wavelength represents Fabry-Perot resonance exhibited as the electric field is concentrated into the thin film a-Si grating. The resonance at 715 nm wavelength represents resonance in which the electric field is strongly confined in the PMMA protective film. The resonance at the wavelength of 565 nm represents a hybrid resonance in which the electric field inside the a-Si grating and the electric field inside the PMMA protective film are combined to each other. Thus, when there are the three different resonances, color purity is reduced.

Further, in the case of a filter having a PMMA protective film having a thickness of 370 nm, the maximum transmittance is exhibited at a resonance wavelength of about 540 nm. Then, as the wavelength increases, the transmittance decreases. However, in a range above about 650 nm wavelength, as the wavelength increases, the transmittance increases again. When such a transmittance characteristic is exhibited, the color purity may be lowered.

Therefore, among the four green filters, the filter having a thickness of 180 nm of the PMMA protective film can produce green having the best color purity.

In a conclusion, the polymeric protective film preferably has a thickness of about 300 nm or less, more preferably 200 nm or less.

FIG. 20 is a graph showing the transmittance of blue, green and red filters based on the presence or absence of the SiO$_2$ optical spacer layer.

Referring to FIG. 20, the transmittance of filters with the SiO$_2$ optical spacer layer may be improved by about 5% compared to the transmittance of filters without the SiO$_2$ optical spacer layer. This is because the SiO$_2$ spacer layer compensates for the phase mismatch between the light beams, which mitigates the ohmic losses in the metal layer, which may improve the interaction between the light beams and improve the light transmittance.

While the foregoing description of the present disclosure has been provided with reference to preferred embodiments of the present disclosure, those skilled in the art will appreciate that various modifications and changes may be made to the present disclosure without departing from the spirit and scope of the present disclosure set forth in the claims that follow.

What is claimed is:

1. A structural color filter comprising:
   a substrate;
   a metal layer disposed on the substrate and having a thickness and extending along a first direction and a second direction intersecting with the first direction; and
   semiconductor gratings exposed to air and disposed on a top face of the metal layer and elongated in the first direction,
   wherein the semiconductor gratings are arranged to be spaced apart from each other in the second direction intersecting with the first direction and have a substantially same thickness which is smaller than a wavelength of visible-light, and wherein the structural color filter includes cavities formed by regions of the top face of the metal layer on which the semiconductor gratings are not disposed, wherein the semiconductor gratings comprise first semiconductor gratings in a first region on the metal layer, second semiconductor gratings in a second region on the metal layer and third semiconductor gratings in a third region on the metal layer, the first to third regions being different from each other on the metal layer, the first region being adjacent to the second region, and the second region being adjacent to the third region, wherein each of the first semiconductor gratings has a first width in the second direction, each of the second semiconductor gratings has a second width in the second direction, and each of the third semiconductor gratings has a third width in the second direction, and the first width being smaller than the second width, and the second width being smaller than the third width, wherein the first semiconductor gratings in the first region have a first duty cycle, the second semiconductor gratings in the second region have a second duty cycle and the third semiconductor gratings in the third region have a third duty cycle, the first to third duty cycles being different from each other, wherein the first semiconductor gratings, the second semiconductor gratings and the third semiconductor gratings are made of amorphous silicon, wherein the first duty cycle has a value of 0.20 to 0.25, the second duty cycle has a value of 0.40 to 0.45, and the third duty cycle has a value of 0.57 to 0.62, and wherein when a light beam is incident on the semiconductor gratings, yellow color light is reflected by the first semiconductor gratings, magenta color light is reflected by the second semiconductor gratings, and cyan color light is reflected by the third semiconductor gratings.

2. The structural color filter of claim 1, wherein the metal layer is made of aluminum (Al) or silver (Ag).

3. The structural color filter of claim 1, wherein the first semiconductor gratings are spaced apart from each other by a first spacing in the second direction, the second semiconductor gratings are spaced apart from each other by a second spacing in the second direction, and the third semiconductor gratings are spaced apart from each other by a third spacing in the second direction.

4. The structural color filter of claim 1, wherein each of the first to third semiconductor gratings has a same thickness which is equal to or greater than about 20 nm and equal to or less than about 60 nm.

5. The structural color filter of claim 1, wherein the semiconductor gratings and the cavities between the semiconductor gratings form a single optical medium layer having an effective refractive index (nTE) determined based on Equation 1 below for a TE (Transverse Electric) polarization:

$$n_{TE} = \sqrt{\varepsilon_1 f + \varepsilon_2 (1-f)} \sqrt{1 + \frac{\pi^2}{3}(\varepsilon_1 f + \varepsilon_2(1-f))\left(\frac{f(1-f)P}{\lambda}\right)^2 \left(\frac{\varepsilon_1 - \varepsilon_2}{\varepsilon_1 f + \varepsilon_2(1-f)}\right)}$$ [Equation 1]

in Equation 1, f, P, $\varepsilon_1$ and $\varepsilon_2$ represent the duty cycle of the semiconductor grating, the period of the semiconductor grating, the permittivity of the semiconductor material, and the permittivity of air, respectively.

* * * * *